(12) United States Patent
Friedman et al.

(10) Patent No.: US 7,747,727 B2
(45) Date of Patent: *Jun. 29, 2010

(54) METHOD AND APPARATUS FOR AUTOMATICALLY ESTABLISHING BI-DIRECTIONAL LINE-SWITCHED RINGS IN TELECOMMUNICATION NETWORKS

(75) Inventors: David A. Friedman, Roseville, CA (US); John Lynde, Research Triangle Park, NC (US); David E. La Motta, Morrisville, NC (US); Cristopher M. Shupp, Apex, NC (US); Chris Eich, Petaluma, CA (US); Alec Hothan, Sacramento, CA (US); Suhas Mansingh, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

This patent is subject to a terminal disclaimer.

(21) Appl. No.: 12/040,674

(22) Filed: Feb. 29, 2008

(65) Prior Publication Data

US 2009/0013256 A1 Jan. 8, 2009

(51) Int. Cl.
*G06F 15/173* (2006.01)
*G06F 11/00* (2006.01)
*H04J 3/04* (2006.01)
*H04M 3/42* (2006.01)

(52) U.S. Cl. .............. 709/223; 370/222; 370/535; 379/201.1

(58) Field of Classification Search ............ None
See application file for complete search history.

(56) References Cited

U.S. PATENT DOCUMENTS

| 7,170,851 B1 * | 1/2007 | Chen et al. ............ 370/222 |
| 2004/0085345 A1 * | 5/2004 | Galou et al. ............ 345/734 |

\* cited by examiner

*Primary Examiner*—Wen-Tai Lin
(74) *Attorney, Agent, or Firm*—Hickman Palermo Truong & Becker LLP

(57) ABSTRACT

A method of automatically provisioning a network-wide function using a plurality of network elements in a service provider network and using a sub-network level approach is provided. In one specific approach, a software wizard facilitates provisioning a bi-directional line switched ring (BLSR). First user input, specifying a plurality of ring attribute values that define attributes of a bi-directional line switched ring, is received. Second user input, specifying one or more working spans for the bi-directional line switched ring, is received. Each of the network elements is automatically configured to participate in the bi-directional line switched ring based on the parameter values. Embodiments may provide a software wizard for implementing the foregoing process. In certain features, spans for a BLSR are automatically selected based on a selection of a first candidate span; only selected nodes and spans that are capable of participating in a BLSR are displayed; and port orientation for all spans in a BLSR is automatically determined based on user input defining port orientation for a first port of a first span.

16 Claims, 16 Drawing Sheets

Edit Map

———— = OC-48 span

— · — · — = Other than OC-48 span with DCC activated

·············· = OC-48 span with DCC disabled

METHOD AND APPARATUS FOR AUTOMATICALLY ESTABLISHING BI-DIRECTIONAL LINE-SWITCHED RINGS IN TELECOMMUNICATION NETWORKS

PRIORITY CLAIM

This application claims the benefit of priority to U.S. patent application Ser. No. 10/315,554, now U.S. Pat. No. 7,363,362, filed on Dec. 9, 2002, the entire contents of each of which are hereby incorporated by reference as if fully set forth herein.

FIELD OF THE INVENTION

The present invention generally relates to provisioning telecommunication networks. The invention relates more specifically to a method and apparatus for managing a plurality of network elements in a service provider network using a sub-network level approach, and for automatically establishing bi-directional line-switched rings in telecommunication networks.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The TMN (Telecommunications Managed Network) hierarchy defines five layers of management systems that may be used to manage telecommunications networks. At each layer, there are associated management systems. Systems at the upper four layers include Business Management Systems (BMS), Service Management System (SMS), Network Management Systems (NMS), and Element Management Systems (EMS). At the network element layer, there are interfaces to the higher-level systems, usually based on established protocols (e.g., TL1, SNMP, etc.).

According to TMN standards, Network Management Systems deal with network capabilities including the managed view of the network focusing on end-to-end connectivity (and presentation of a network view to SML). Element Management Systems deal with network element data such as logs and control of managed portions of network elements, and mediation between the Network Management Layer (NML) and Network Element Layer (NEL). Network Element layer systems deal with interfaces between managing system and equipment.

Accordingly, many vendors have built Craft Management Systems (or craft tools) that allow a craft technician to perform setup and repair activities for the network elements. Most craft tools provide ASCII based entry windows where the craft technician is required to input commands with a specific syntax in order to produce an expected response from the network element. Over the past decade, more craft tools have started to use a graphical user interface ("GUI") approach, although most simply convert a user's action into the associated ASCII commands. The move from ASCII command interfaces to user-friendly GUIs in craft tools has increased user productivity and reduced errors.

Most craft tools that are based on ASCII command entry windows interact with a single network element at a time. This is the paradigm that the TMN standards expect and most vendors have implemented. Although this has proved to be a successful paradigm, the responsibility for interacting correctly with each node, in the correct order, is placed on the craft technician. Some operations require interaction with multiple network elements. Although these can be done through interacting with each node separately, the chance for user error is significant. There has been no way to interact with the network as a whole.

An example of a GUI-based craft tool is Cisco Transport Controller (CTC), from Cisco Systems, Inc., San Jose, Calif. The user interface of CTC is implemented using Java and Common Object Request Broker Architecture (CORBA) is used to interface between the network element and the craft tool. CORBA uses IP to communicate with network elements over a SONET/SDH DCC. Topology discovery is accomplished using Open Shortest Path First (OSPF).

To further assist users in performing complex network management functions, GUI-based craft tools have implemented software wizards. A wizard may be defined as an interactive utility that guides the user through a potentially complex task. Wizards are often implemented as a sequence of dialog boxes that the user can move forwards and backwards, filling in the required details. In theory, the expertise of a human wizard is encapsulated in the software wizard, allowing the average user to perform expertly.

Despite the many advantages offered by GUI-based craft tools, certain tasks have remained difficult or error-prone. Establishing a bi-directional line switched ring (BLSR) in a telecommunication network is an example of such deficiencies. In the typical approach, a user who wants to set up a BLSR needs to interact with each network element separately. Proper setup requires the user to enter compatible parameter values in data entry forms for the individual nodes participating in that ring. For example, proper ring setup requires each node to have the correct port value entered for an East port and a West port of the node. If the user enters inconsistent values, the ring will not work. As another example, the typical approach requires a user to enter numeric values, such as the ring identifier and reversion time, at each node. A BLSR ring could have up to 32 nodes, which increases dramatically the chance for introducing errors. An incorrect entry for any of the nodes would cause the ring to be malformed and inoperative. The user would have no way to determine, before provisioning the data to a network element, that the user had entered incorrect data values.

Thus, in the past, there has been no way to control multiple non-connected sub-networks to define higher-level concepts, such as a ring in its entirety, and provision multiple network elements concurrently and automatically.

Based on the foregoing, there is a clear need in this field for a way to enter information that applies to all nodes at once.

There is a clear need for a way to control multiple non-connected sub-networks for various management purposes. For example, there is a need to provide some way to propagate the information to all nodes concurrently and automatically, so that the craft technician can focus on defining network-level concepts without having to interact repeatedly with multiple network elements.

There is also a need for a way to check user data entry to identify errors before the data is provisioned to a network element.

There is a particular need for an improved way to define and automatically provision a bi-directional line switched ring (BLSR) in a service provider network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
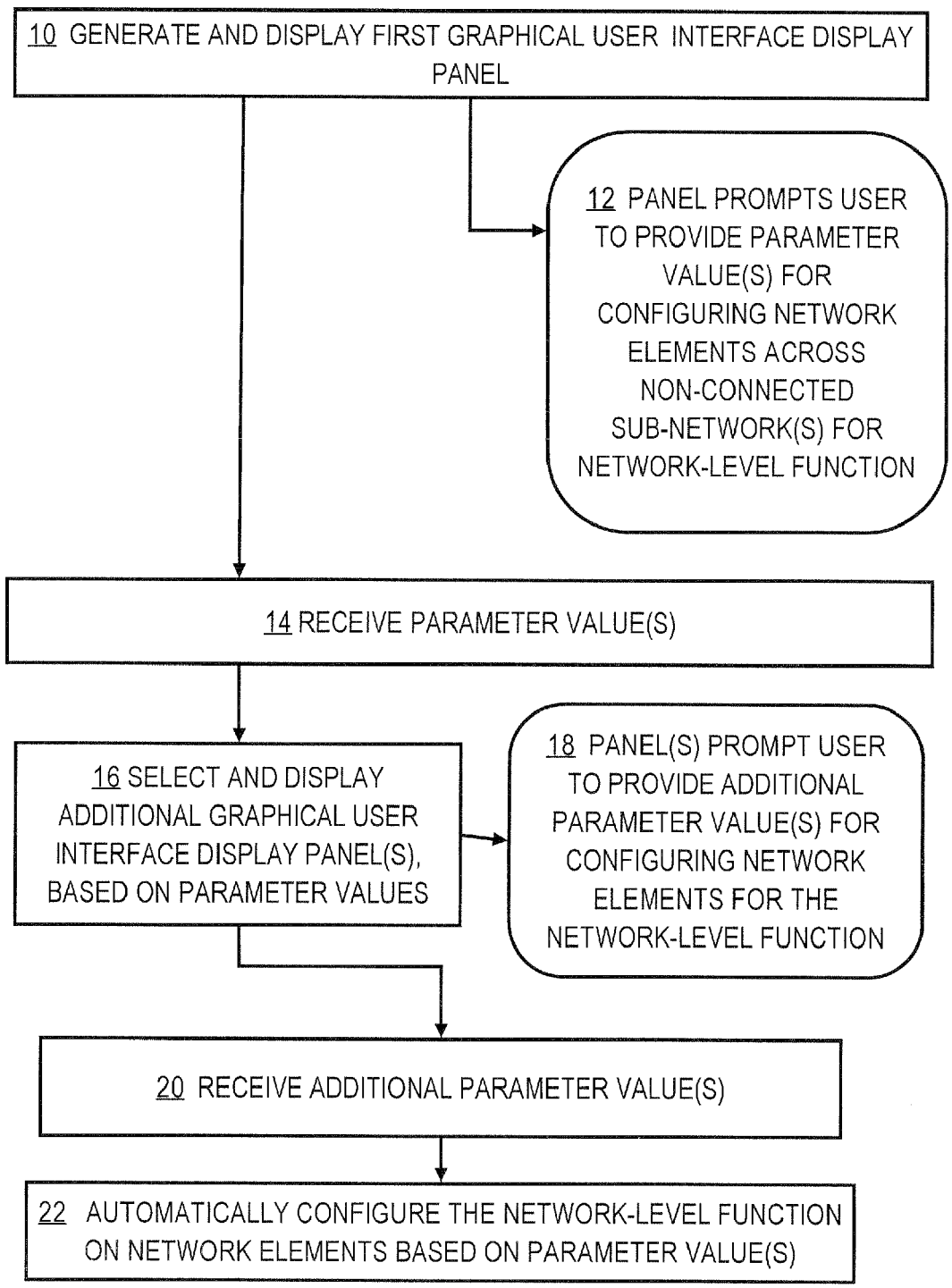
FIG. 1A is a flow diagram providing a high-level view of a process for provisioning network elements across multiple non-connected sub-networks.

A method and apparatus for automatically establishing bi-directional line-switched rings in telecommunication networks is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Automatic Provisioning of Bi-Directional Line Switched Rings Using a Software Wizard
  2.1 Definitions and Operating Context
  2.2 Process for Provisioning Rings
  2.3 Ring Upgrade Wizard
  2.4 Ring Edit Window
  2.5 Other Wizards and Feature Extensions
  2.6 Network Element Discovery
3.0 Implementation Mechanisms-Hardware Overview
4.0 Extensions and Alternatives
Appendix A—Class Definitions 1.0 General Overview The needs identified in the foregoing background, and other needs and objects that will become apparent for the following description, are achieved in the present invention, which comprises, in one aspect, a method of managing a plurality of network elements in a service provider network using a sub-network level approach. A first graphical user interface display panel is generated and displayed, and prompts a user to provide one or more parameter values for configuring the plurality of network elements with respect to a particular network-level function. The one or more parameter values are received. One or more additional graphical user interface display panels are selected and displayed based on the parameter values. The additional panels prompt a user to provide one or more additional parameter values for configuring the plurality of network elements with respect to the network-level function. One or more additional parameter values are received. The network-level function is automatically configured on each of the network elements based on the parameter values. As a result, network-level concepts and attributes can be provisioned to elements located in multiple non-connected sub-networks.

In another aspect, a method of automatically provisioning a bi-directional line switched ring (BLSR) using a plurality of network elements in a service provider network and using a sub-network level approach is provided. First user input, specifying a plurality of ring attribute values that define attributes of a bi-directional line switched ring, is received. Second user input, specifying two or more working spans for the bi-directional line switched ring, is received. Each of the network elements is automatically configured to participate in the bi-directional line switched ring based on the parameter values. Embodiments may provide a software wizard for implementing the foregoing process. In certain features, spans for a BLSR are automatically selected based on a selection of a first candidate span; only selected nodes and spans that are capable of participating in a BLSR are displayed; and port orientation for all spans in a BLSR is automatically determined based on user input defining port orientation for a first port of a first span.

In other aspects, the invention encompasses a computer apparatus and a computer-readable medium configured to carry out the foregoing steps.

FIG. 1A is a flow diagram providing a high-level view of a process for provisioning network elements across multiple non-connected sub-networks. The process of FIG. 1A may be implemented in any of a variety of software wizards that enable a user to rapidly manage and provision network elements across multiple non-connected sub-networks of a service provider network for network-level functions.

In one embodiment, a sub-network level software wizard is integrated into a craft tool. The sub-network level wizard can interact with multiple network elements concurrently. As a result, end-to-end connectivity and sub-network level setup are more easily achieved. In one specific embodiment, a BLSR Setup Wizard is provided. In alternative embodiments, an A-Z Circuit Provisioning Wizard, UPSR Setup Wizard, Timing Distribution Wizard, DCC Tunneling Wizard, Install Wizard, Span Upgrade Wizard, and Orderwire/Virtual Wire Wizard are provided. Thus, the scope of this disclosure extends to all uses of software wizards to perform multi-network element functions in craft management systems.

Referring now to FIG. 1A, in block 10, a first graphical user interface panel is generated and displayed. As indicated by block 12, the first panel prompts a user to provide one or more parameter values for configuring a plurality of network elements across one or more non-connected sub-networks with respect to a particular network-level function.

In block 14, one or more parameter values are received. Block 14 represents a server-side element receiving user input from a client-side element, or data input from another source, for the parameter values.

In block 16, one or more additional graphical user interface display panels are selected and displayed, based on the parameter values. As indicated by block 18, the additional panels prompt a user to provide one or more additional parameter values for configuring the network elements with respect to the network-level function. One or more additional parameter values are received in block 20. In block 22, the network-level function is automatically configured on each of the network elements based on the parameter values.

As more specifically disclosed herein, a BLSR Setup Wizard assists a user in selecting nodes to form a ring by intelligently allowing selection of nodes based on prior selections made during the interaction with the wizard. This type of interaction and iterative definition is not feasible on a command based individual node interface basis.

Further, in a BLSR Setup Wizard as disclosed herein, spans are filtered, so that a selection process only includes spans that are actually usable in a ring. This approach will not introduce errors that manual human entry could potentially introduce. Further, when a span is not included, a reason is displayed explaining why nodes are not included, so the user can understand what may be wrong. In an alternative embodiment, the user may request and receive further explanation about why nodes or spans are not included. In other features, additional spans are automatically selected when the only possible formation of a ring includes those spans. This saves user time. In yet another feature, significant "sanity checking" is performed on data entry values before the craft tool attempts to provision any network element. The disclosed checking saves time and improves network and software performance.

Accordingly, a craft tool with a multi-network element level wizard enables a user of a craft tool to perform telecommunications sub-network level setup. Ease of use is provided, there is no requirement to interact with nodes individually, intelligence is provided to assist the user to make subsequent selections based on previous information, efficiency is improved, and opportunities for errors are reduced.

2.0 Automatic Provisioning of Bi-Directional Line Switched Rings Using a Software Wizard 2.1 Definitions and Operating Context In this description, the following words and acronyms have the following meanings:

| | |
|---|---|
| 4F | 4 Fiber BLSR ring |
| 2F | 2 Fiber BLSR ring |
| BLSR | Bi-directional Line Switching Ring |

Figure 1B:
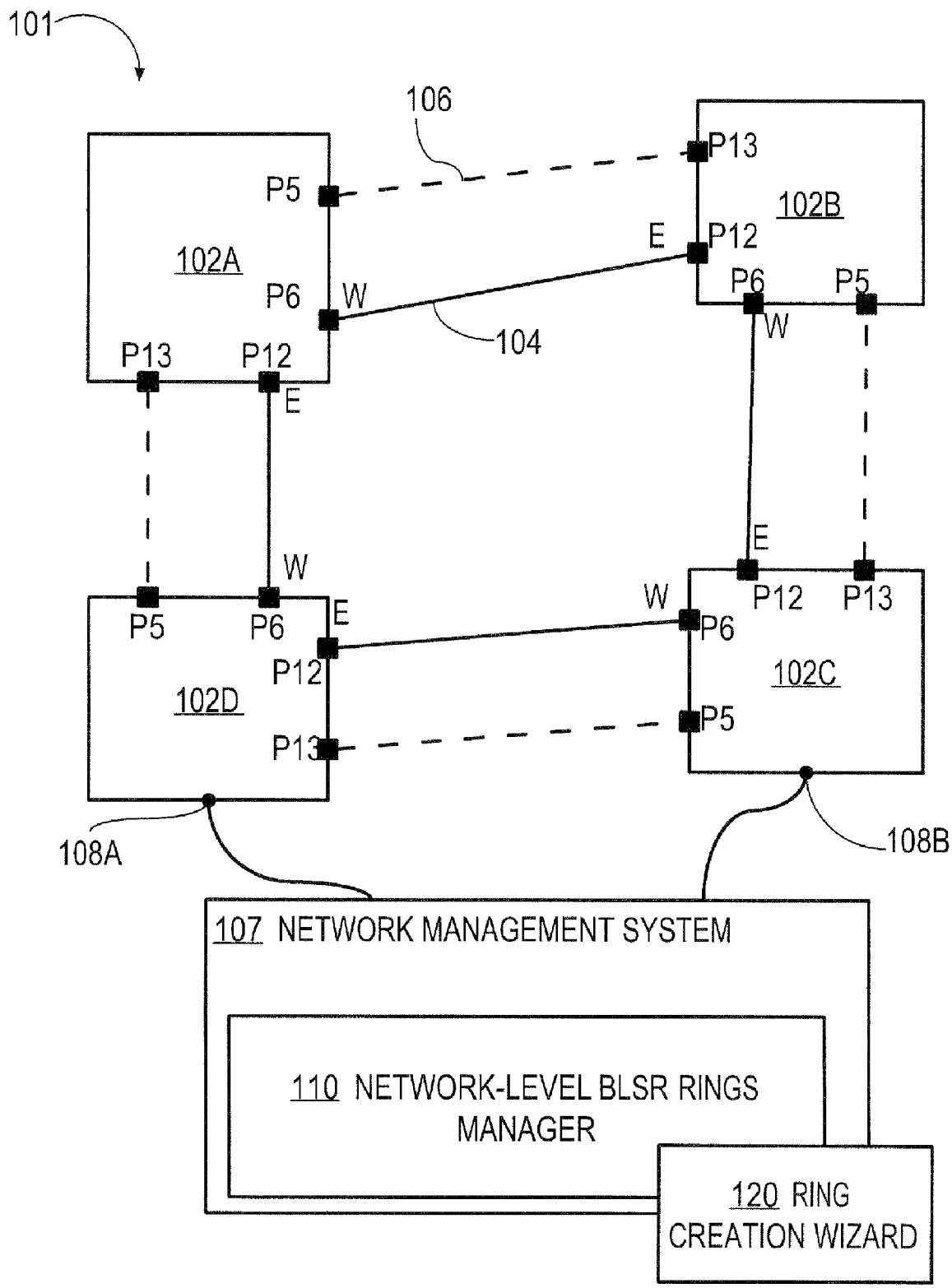
FIG. 1B is a simplified block diagram of a hypothetical BLSR.

Certain embodiments described herein are useful in the context of provisioning a BLSR. In general, large-scale network service providers use BLSRs to interconnect high-speed, high-capacity network nodes. FIG. 1B is a simplified block diagram of a hypothetical BLSR. Network elements or nodes 102A, 102B, 102C, 102D participate in a ring 101. Each of nodes 102A, 102B, 102C, 102D typically comprises a network switch device, such as one of the Cisco ONS15327 or ONS15400 Series SONET/SDH Multiservice Provisioning Platforms from Cisco Systems, Inc., San Jose, Calif. Nodes may be located in multiple non-connected sub-networks.

Each node is communicatively coupled to a neighbor node by a "working" or "active" span 104. In a 4-fiber BLSR, each node additionally is communicatively coupled to neighbor nodes by a "protect" or "standby" span 106. The standby span becomes active, or starts carrying traffic, if the active span fails or a protection switch otherwise occurs.

Spans 104, 106 terminate at ports of nodes. For example, span 104 terminates at port P6 of node 102A and port P12 of node 102B. For purposes of provisioning a direction of network traffic flow, each port is designated as either an eastbound (East) or westbound (West) port. Thus, in FIG. 1B, port P6 of node 102A is a West port and port P12 of node 102B is an East port. A span must interconnect a West port of a first node to an East port of a second node; a span may not connect two West ports or two East ports. Properly provisioning port designations as west or east, and ports that satisfy specified requirements, is essential to creating a working BLSR.

Standby spans also have ports on nodes designated as east and west. Further, although four (4) nodes are shown in FIG. 1B for purposes of illustrating a simple example, in practice a BLSR may have up to 32 network elements arranged in a ring. The port numbers specified in FIG. 1B are provided for example purposes only, and are not required.

A network management system 107 is communicatively coupled to management interfaces 108A, 108B, etc. of each of the nodes 102A, 102B, 102C, 102D. Network management system 107 may execute system software for performing various management tasks with respect to the nodes 102A, 102B, 102C, 102D, or other network elements. In one embodiment, network management system 107 supervises or includes a ring creation wizard 120 that is accessed through a network-level BLSR rings manager 110. Network management system 107 may provide a browser-based interface, and the manager 110 may be implemented as a window or pane having function buttons. In certain embodiments, network management system 107 is, or forms a part of, an element management system (EMS). In one embodiment, wizard 120 is accessed by user input selecting a Create button of manager 110.

2.2 Process for Provisioning Rings

Figure 2A:
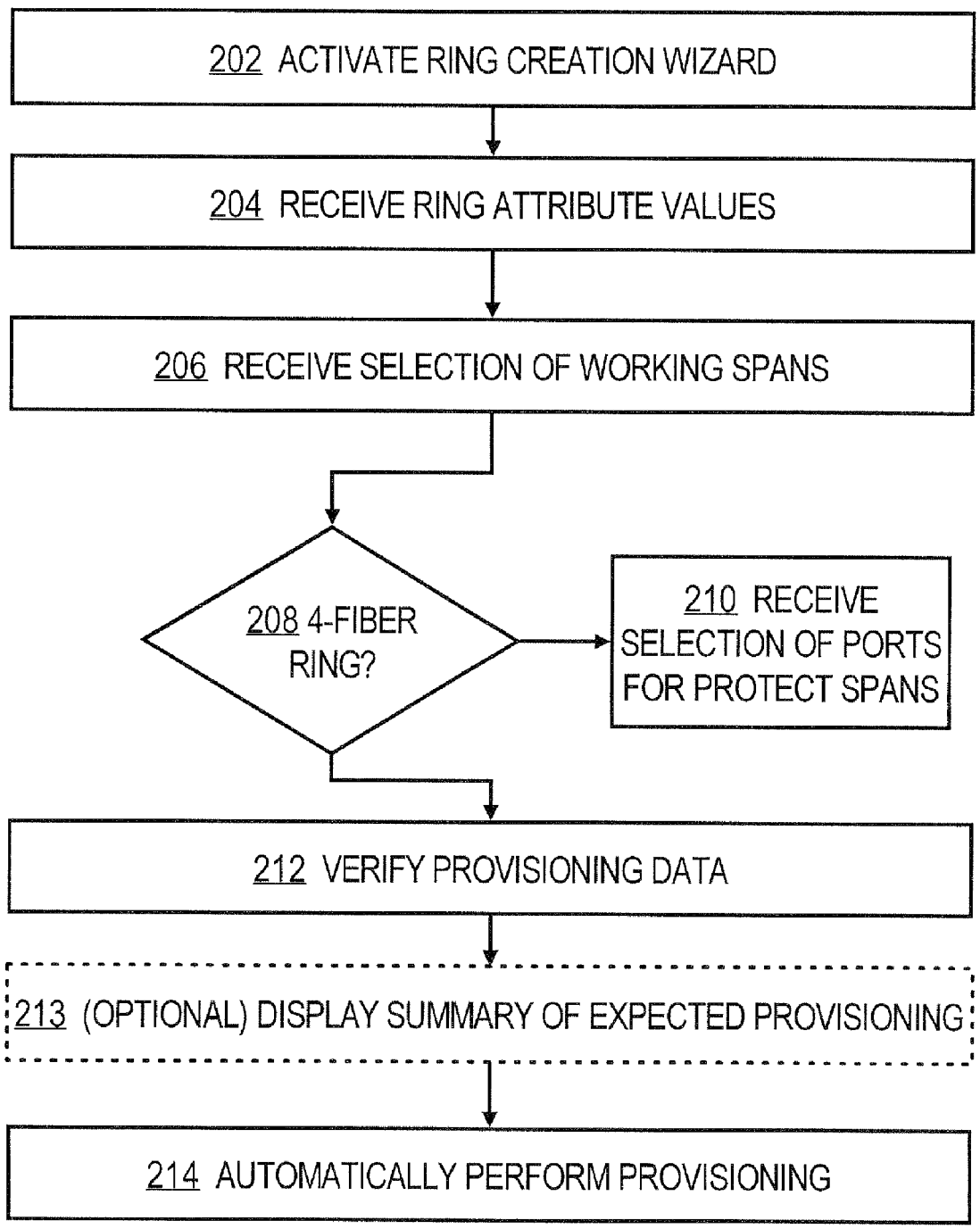
FIG. 2A is a flow diagram of a process for provisioning rings using a ring creation wizard, according to one embodiment.

FIG. 2A is a flow diagram of a process for provisioning rings using a ring creation wizard, according to one embodiment. For purposes of illustrating an example embodiment, the process of FIG. 2A is described herein with reference to the ring of FIG. 1B and with reference to certain other drawing figures. However, embodiments are not limited to the context of these drawing figures.

In block 202, a ring creation wizard is activated. For example, in the context of FIG. 1B, network management system 107 is launched, and a Rings tab is selected, which activates network-level BLSR rings manager 110. The rings manager 110 presents a pane or window that includes a Create button. Selecting the Create button instructs network management system 107 that the user wishes to create a BLSR. In response, network management system 107 activates ring creation wizard 120, which presents a structured set of screen displays or panels to the user, as described further herein.

Figure 2B:
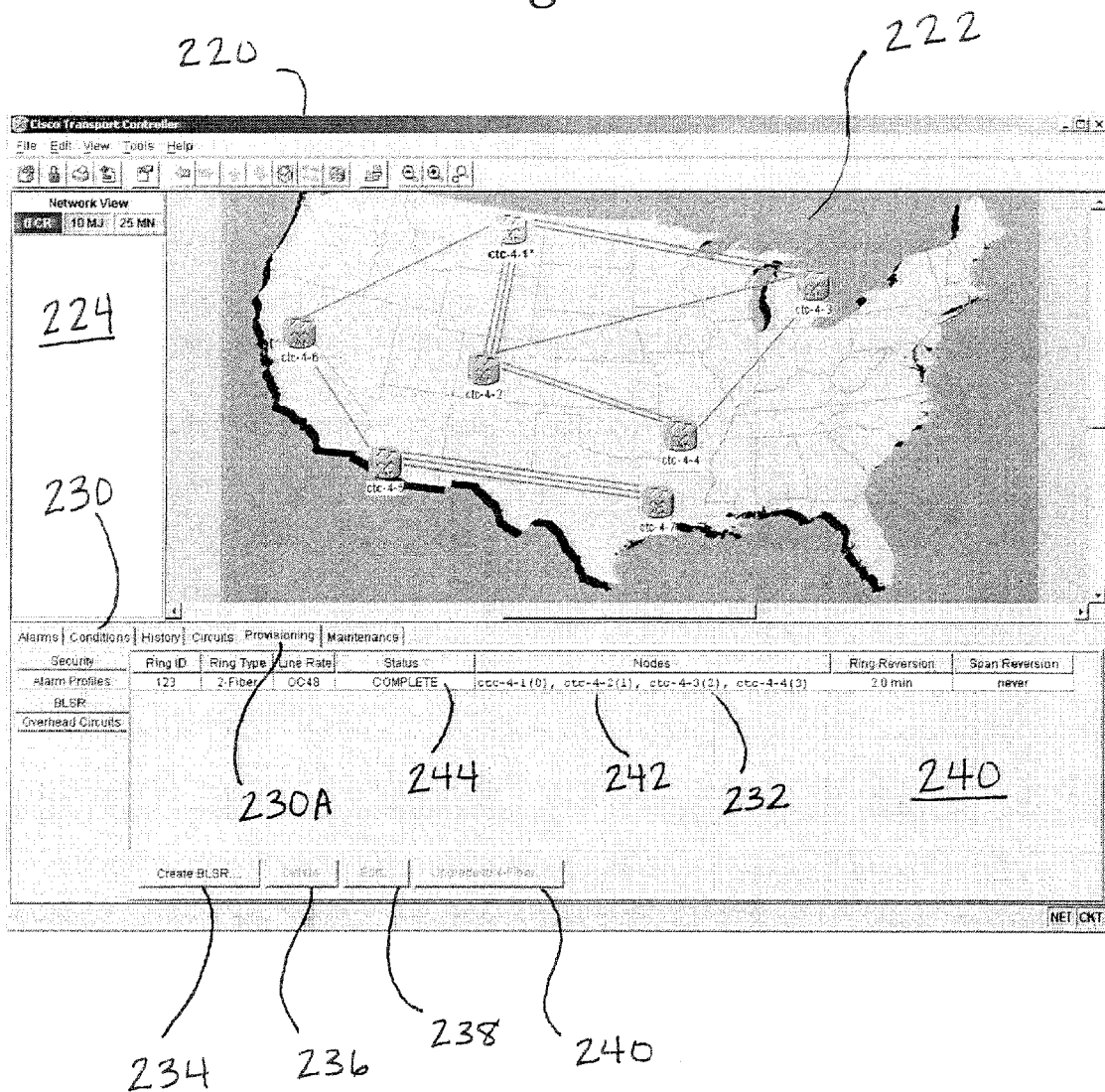
FIG. 2B is a screen display diagram that shows a network-level BLSR pane that may be displayed in one specific embodiment.

FIG. 2B is a screen display diagram that shows a network-level BLSR pane that may be displayed in one specific embodiment. Screen display 220 includes a topological map 222, network view selector 224, and function tabs 230 for selecting network management functions. For example, provisioning functions are accessed by selecting Provisioning tab 230A. In response, network-level BLSR pane 240 is displayed. The pane 240 contains a table 232 that lists all then-current BLSR rings in the network. Each row of the table describes the characteristics of a ring.

The table 232 may contain a Nodes column 242 that identifies all nodes in the ring using a node identifier. A State column 244 indicates a state of the ring, e.g., COMPLETE, INCOMPLETE, CREATING or EDITING. A ring is in COMPLETE state when the provisioned BLSR information related to all the nodes of the ring have been retrieved and all its lines are up (East port connected to West port, etc.). A ring is in CREATING state if data structures representing the ring have been created but the ring is not yet provisioned. In one embodiment, as presented to a user, the ring is never in the CREATING state or EDITING; such states are used only in internal processing.

In this embodiment, the screen display 220 may have a Create button 234, Delete button 236, Edit button 238, and Upgrade-to-4-Fiber button 240. The Edit button 238 is enabled only if the selected ring is in COMPLETE state. The Delete button 236 is enabled if the selected ring is in COMPLETE or INCOMPLETE state. The Create button 234 is always enabled, and selecting it activates ring creation wizard 120. The Upgrade button 240 is provided if for any selected ring that is not being deleted, and it is a 2F ring and each node is upgradeable to 4F.

Figure 6:
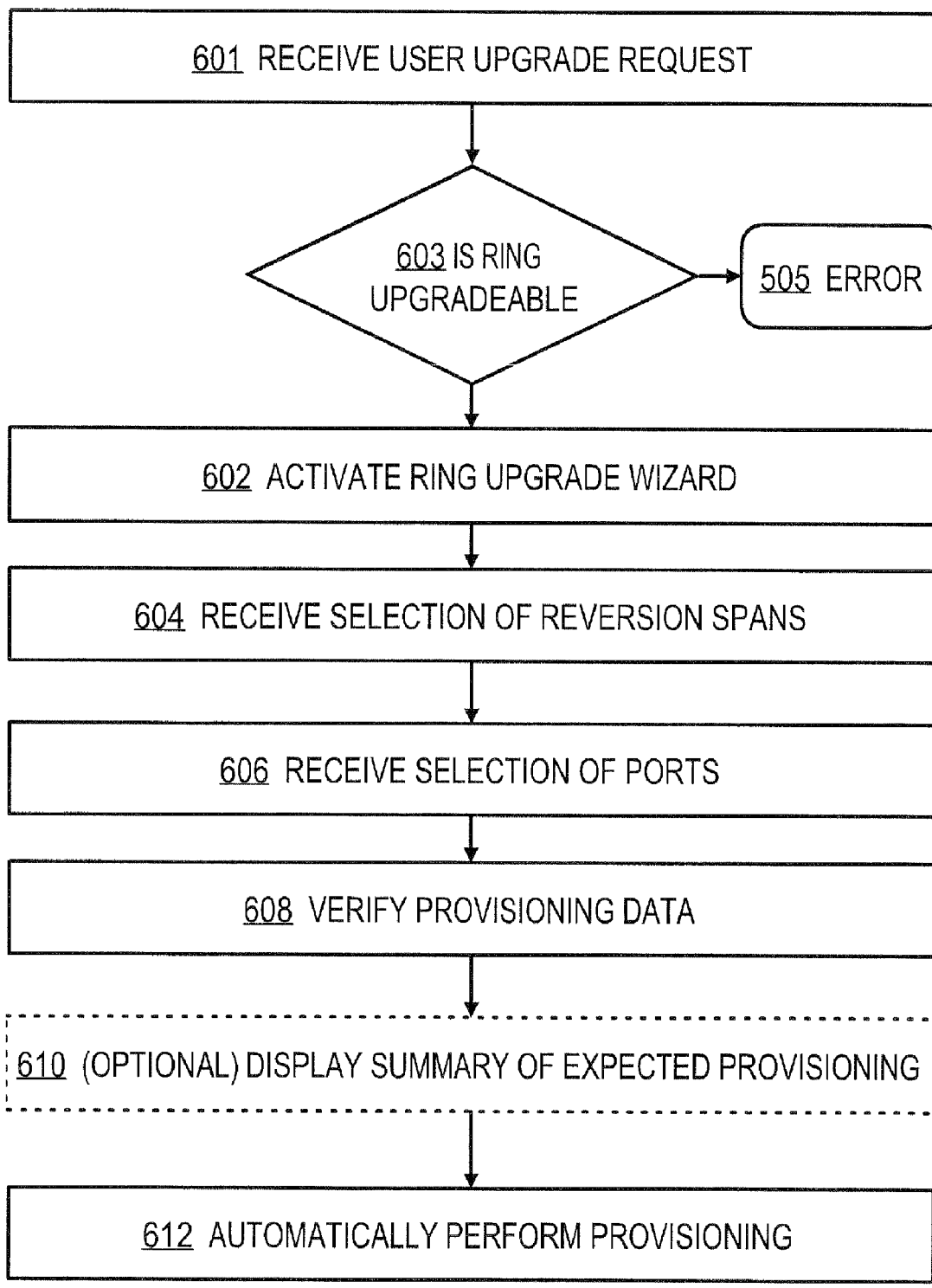
FIG. 6 is a flow diagram of a process of operating a ring upgrade wizard.

In one embodiment, selecting the "Upgrade" button 240 activates an upgrade wizard, which is described further herein with respect to FIG. 6. Other wizards may be provided in association with other buttons. For example, an "Add Node Wizard" and "Remove Node Wizard" may be provided.

In block 204, ring attribute values are received. The ring attribute values specify basic attributes of a BLSR. In one embodiment, the attribute values are received by displaying a wizard panel that prompts a user to enter appropriate values.

As part of either block 202 or block 204, wizard 120 performs a BLSR element discovery process in order to determine which network elements and spans may participate in a BLSR. An example of such a process is described further herein with respect to FIG. 4A-FIG. 4C and FIG. 5A-5C.

Figure 3A:
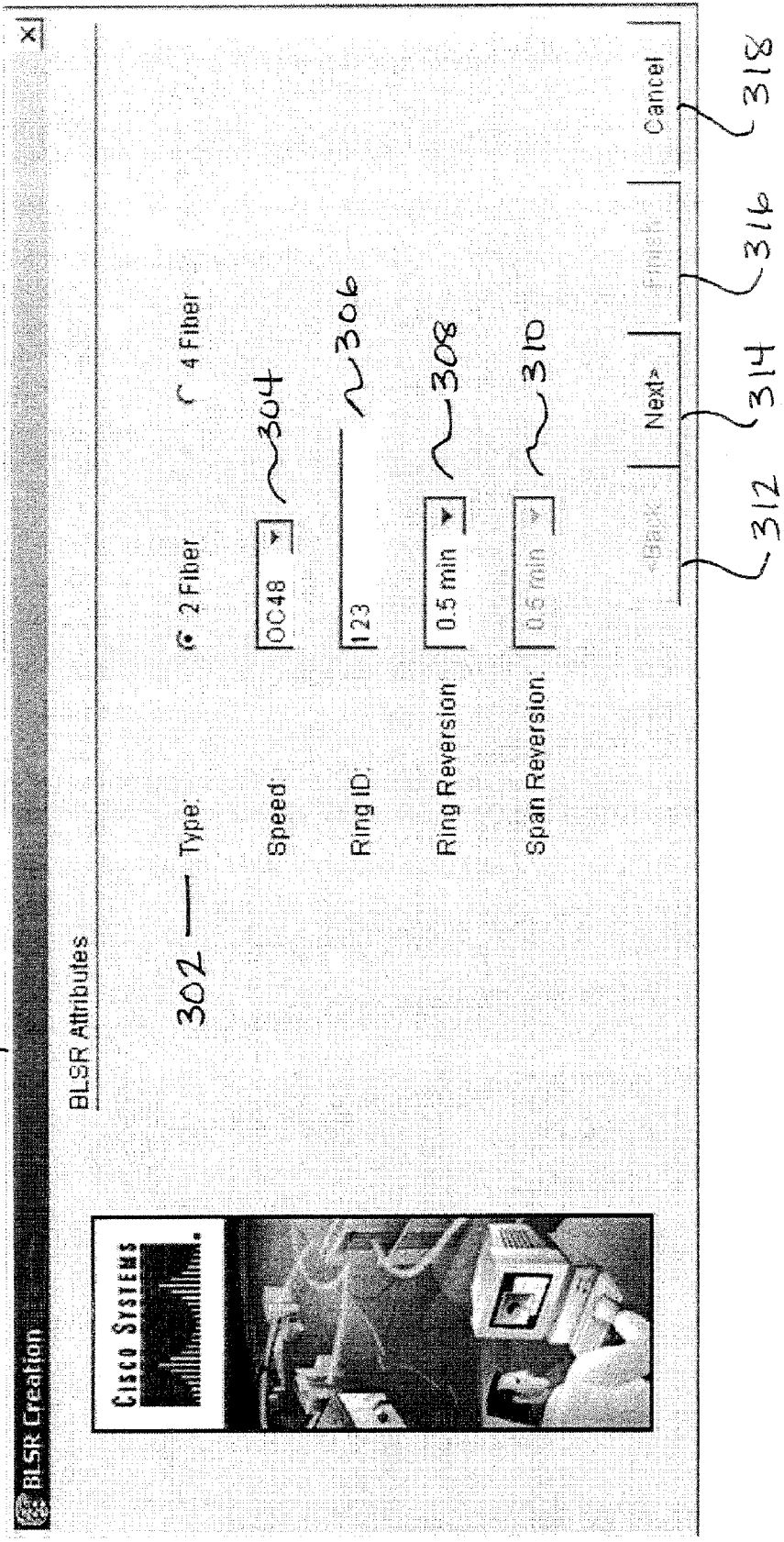
FIG. 3A is a screen display diagram that illustrates an example of a ring attributes panel that may be used.

FIG. 3A is a screen display diagram that illustrates an example of a ring attributes panel that may be used as part of block 204. Panel 300 includes Type radio buttons 302 that are used to specify either a 2F or 4F ring. By selecting either a "2 Fiber" or "4 Fiber" radio button, a user may specify that the ring to be created is a 2F or 4F BLSR. In one embodiment, 2F is specified by default. A Ring Speed drop-down menu 304 is used to specify a data transmission speed of the ring, in terms of industry-standard link rate designations. For example, "OC48" specifies a data transmission rate of 2.4 gigabits per second (Gbps); "OC12" specifies 622 Mbps, etc. In one embodiment, OC48 is specified by default.

A Ring ID field 306 receives a unique identifier for the ring to be created. In one embodiment, each ring identifier is an integer, and a warning is displayed if a user requests a ring identifier that is already in use. A Ring Reversion drop-down menu 308 specifies an amount of time after which the ring should revert from one set of spans to another set of spans. A Span Reversion drop-down menu 310 is available only when the Type of the ring is 4F, and specifies the time that should elapse before the traffic on the protect span switches to the working span.

Panel 300 further includes one or more navigation buttons such as Back button 312, Next button 314, Finish button 316, and Cancel button 318. Selecting Back button 312, when available, causes wizard 120 to display a panel for a sub-process or step that logically precedes a step associated with the then-current panel. Selecting the Next button 314, when available, causes wizard 120 to display a panel for a sub-process or step that logically follows a step associated with the then-current panel. Finish button 316, when available at the last panel, causes wizard 120 to finish processing data entered by the user and provision the network nodes, as described further herein. Selecting Cancel button 318 terminates operation of wizard 120, and no ring is provisioned as a result of the operation.

Referring again to FIG. 2A, in block 206, a selection of two or more working spans or links is received. In one embodiment, block 206 is reached when a user selects the Next button 314 from the ring attribute panel 300. In response, wizard 120 displays a working link selection panel.

Figure 3B:
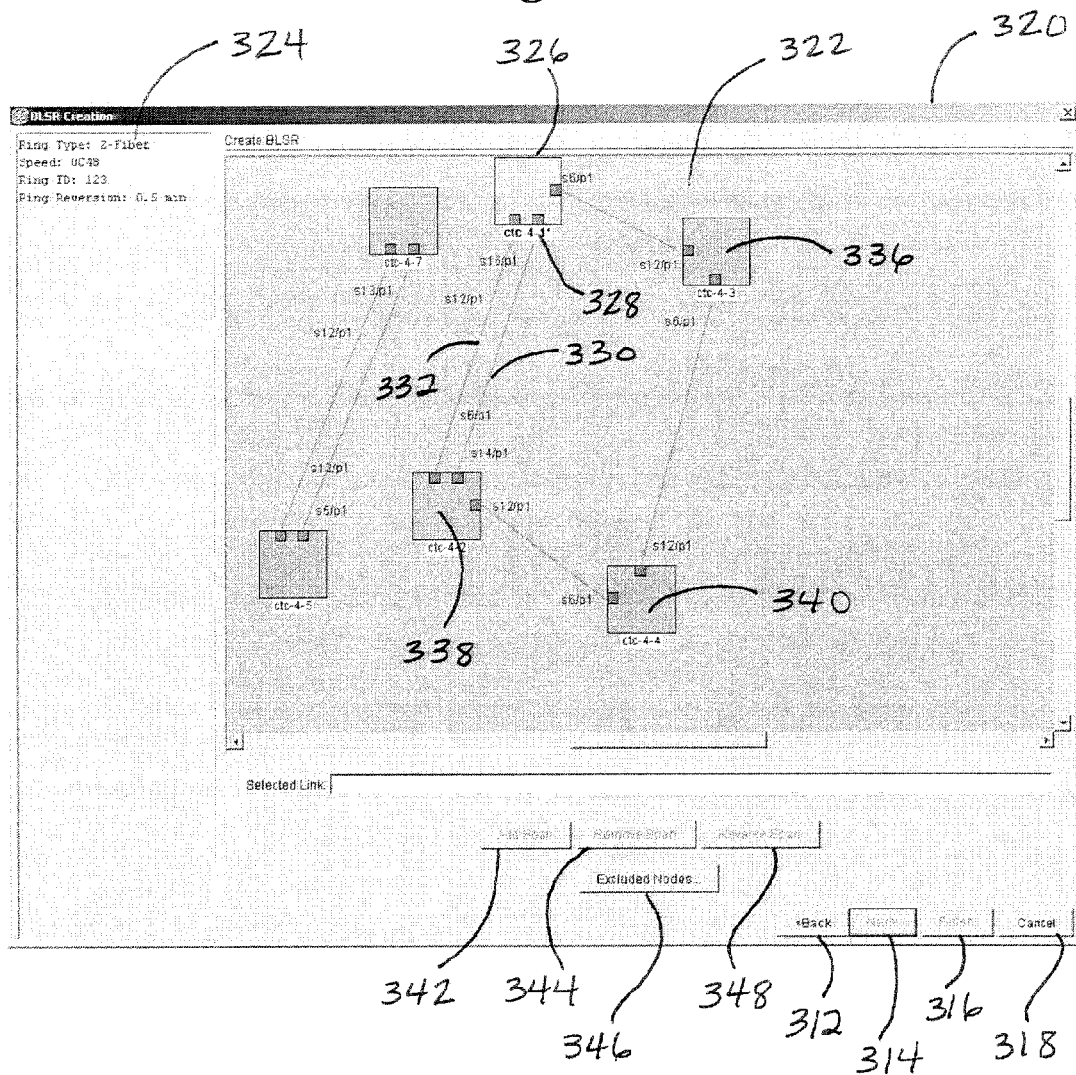
FIG. 3B is a screen display diagram showing a working link selection panel.

FIG. 3B is a screen display diagram showing a working link selection panel. In general, working link selection panel 320 comprises an interactive map 322 of the network and a panel 324 displaying details about a selected span. In the example display of FIG. 3B, map 322 shows a ring comprising nodes 326, 336, 338, and 340. Each node includes a node identifier, two or more spans, and port identifiers for ports that terminate the spans. For example, node 326 includes a node identifier 328 of "ctc-4-1," span 334 that is coupled to node 336, and spans 330, 332 that are coupled to node 338. Span 334 terminates at slot "6", port "1" ("S6/P1") of node 326 and slot "12," port "1" ("S12/P1") of node 336.

In one embodiment, the map 322 shows a snapshot of the links and nodes at the time the pane is made visible. Alternatively, nodes and link states are updated into map 322 in real-time based on changes occurring in the network.

Page 320 further comprises an Add Span button 342, Remove Span button 344, Reverse Span button 348, and Excluded Nodes button 346. A span may be selected in map 322 by moving a graphical cursor to the span using a pointing device and activating a selection button, that is, by "clicking on" or "double-clicking" the span in the map. If a span is selected by a double click, it is automatically added to the ring. After a span is selected by a single click, selecting the Add Span button 342 adds the span to the ring. Similarly, selecting a span and then activating the Remove Span button 344 removes the span from the ring. Selecting the Reverse Span button 348 causes wizard 120 to reverse and re-display east/west port directions for a selected span, and for all other spans which are continuous and selected.

In one embodiment, in map 322, a link is displayed in a color that corresponds to a state of selection of the span. For example, a gray span is not included in a ring. A blue span is included in the ring. In this embodiment, link selection operations may vary according to a color or state of a selected span. For example, if a user double clicks on a gray link, that link is added to the ring. If a link is red, it cannot be added to a ring, and therefore clicking on the red link does not add it. Links are red when the nodes at their endpoints belong to different OSPF areas. If the user double-clicks on a blue link, that link is removed from the ring. The Add button is enabled if the link is not already in the ring. The Remove and Reverse buttons are enabled if the selected link is in the ring In one embodiment, map 322 displays only unprotected DCC links that have a transmission rate equal to the speed that was selected using Speed drop-down menu 304 of panel 300.

Further, only nodes connected to at least two such links, which have less than two BLSR rings already defined, are displayed.

Selecting the Excluded Nodes button 346 causes wizard 120 to display, in map 322, one or more network nodes that have been excluded from the map display based on the foregoing criteria, or for other reasons. The reasons may be displayed in text form to the user. An example of a displayed reason is: "Node X does not have enough spans of the right speed available for BLSR provisioning."

When a span is added to the ring, if the span is the first span of a ring or otherwise isolated, then a default selection of East/West port orientation or direction is performed automatically by wizard 120. For example, the lower slot number is designated as West, and the higher slot number is designated as East. If the newly added span extends a ring portion, then the direction designations for the newly added span are performed automatically in a manner that is compatible with the direction of all other spans that are then present in the ring. For example, a port of the newly added span that is adjacent to a West port of a previously added span is designated as East. If the newly added span joins two separate ring portions, then the direction designations for all spans are recomputed automatically so that they are all compatible. For 4F rings, spans for the protect ring are selected in a subsequent step.

In one embodiment, under control of program logic, wizard 120 automatically selects additional spans and adds them to a ring when possible. For example, if the user selects a first span and there is only one other span that could be used between each of the remaining nodes on the ring, then that other span is added to the ring automatically. This significantly decreases the time required for the user to create a BLSR ring.

When the user has selected the links that correctly form a complete loop, then Next button 314 of panel 320 is enabled that the user may proceed.

In block 208, a test is performed to determine whether the ring to be created is a 4F BLSR. If so, then in block 210 a selection of ports for protect spans is received. If not, then in block 212 the provisioning data entered thus far is verified. In one embodiment, if the current ring is a 2F BLSR, verification processing is performed; if verification fails, various warning messages are displayed. If the current ring is a 4F BLSR, processing proceeds at a Protect Port Selection panel.

Figure 3C:
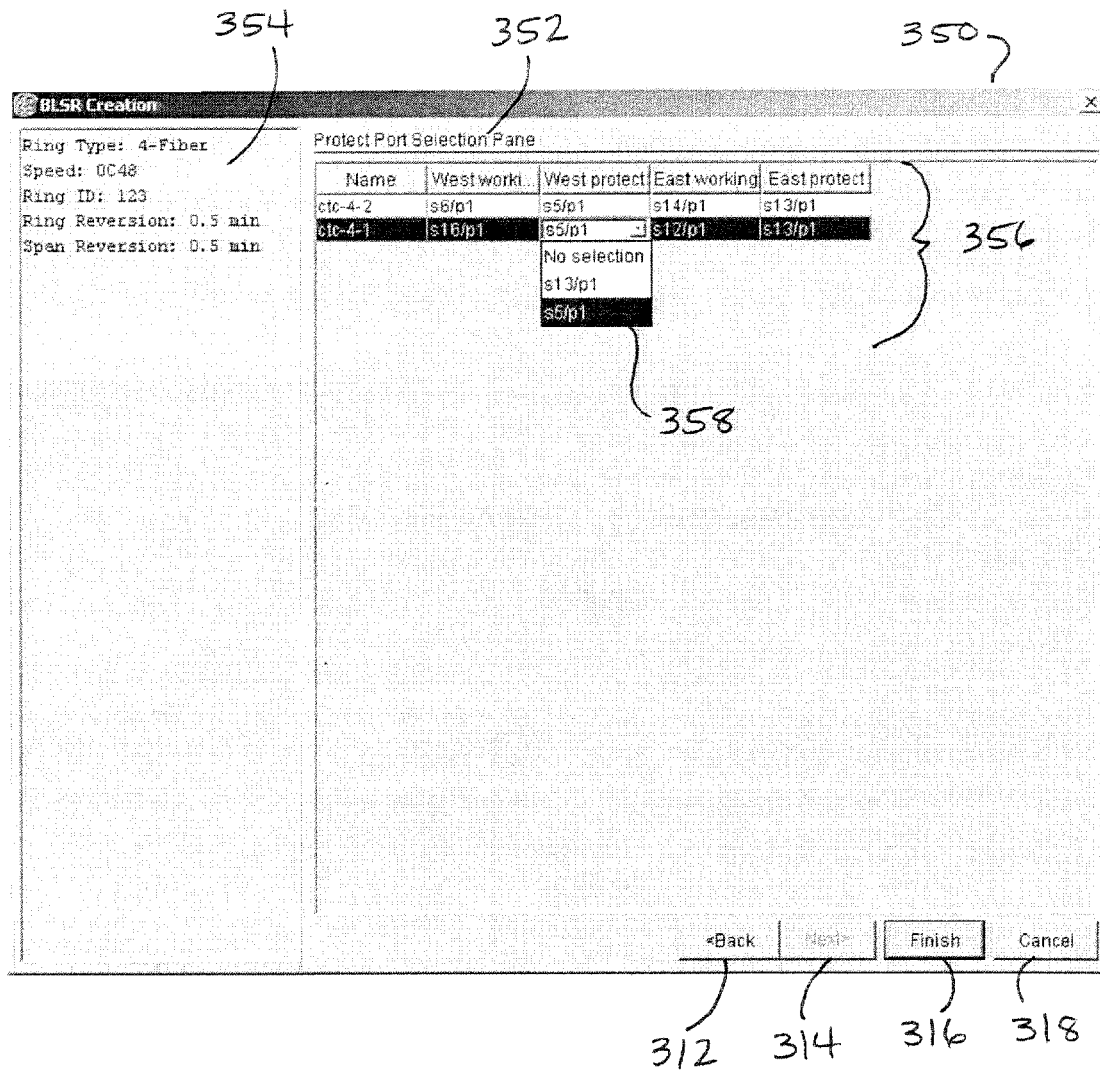
FIG. 3C is a screen display diagram that illustrates a protect port selection panel that may be used.

FIG. 3C is a screen display diagram that illustrates a protect port selection panel that may be used. In general, protect port selection panel 350 comprises a protect port selection pane 352 and a details pane 354. The details pane 354 specifies basic information about the then-current BLSR.

The protect port selection pane 352 displays a table 356 that lists the nodes in the ring and the East Port, West Port, East Protect Port and West Protect Port. In one embodiment, the East Port and West Port columns are non editable, and show the port values that were selected in the previous panel. The East Protect Port and West Protect Port columns initially are set to "Not Selected," and have pull down menus that enable a user to select a slot and port that can be used as 4F BLSR protect spans for the then-current ring. The slot and port values that are available for selection in the pull-down menus are provided from a filtered list that is automatically generated by wizard 120. When all selections have been made, and there are no duplicate selections, the Next button 314 is enabled.

Control then passes to block 212, in which the provisioning data is verified and subjected to one or more provisioning checks. The checks are directed to determining, in advance, that the proposed BLSR actually can be created in the network. If the checks are successful, then control passes to block 214, in which provisioning is automatically performed. In one embodiment, control passes to block 212 in response to selecting the Finish button from a panel. In response, checks are performed and, if successful, a process of creating the BLSR ring across the network is initiated. A detailed status report may be provided to the user upon completion.

If a problem occurs, the user is informed of the problem and given a chance to correct it (if possible). For example, if a user interacting with a different instance of network management system 107 adds a node to another BLSR during the phase when span candidates are collected, then an error will occur. The initial map will indicate that the node could be added, but when provisioning is attempted, the node cannot be added into the proposed ring.

Optionally, in block 213, a summary of the expected provisioning is displayed in one or more additional panels. Such panels may inform the user of what will be provisioned. If the then-current ring is a 4F BLSR, then the summary panels may also inform the user that the protect ports are assumed to be correct, and that the user should verify fiber connectivity. Alternatively, such verification may be performed automatically. The summary panels may include a Finish or confirmation button that is selected when a user is ready to proceed or when the verification is done.

Using these processes, an administrator can provision network-level concepts or attributes, such as BLSR rings, across network elements of multiple non-connected sub-networks.

2.3 Ring Upgrade Wizard

FIG. 6 is a flow diagram of a process of operating a ring upgrade wizard. For example, the process of FIG. 6 may be used for upgrading a 2-fiber BLSR ring to a 4-fiber BLSR ring.

In block 601, a user upgrade request is received. In one embodiment, block 601 involves receiving a user selection of an existing ring in table 232 and a selection of the Upgrade button 240 of FIG. 2B. In block 603, a test is performed to determine whether the selected ring is upgradeable. For example, a BLSR ring is upgradeable when the ring is in the COMPLETE state, the ring is a 2F BLSR, and all nodes in the ring can support a 4F BLSR, meaning that all nodes have OC-N lines available and do not have a 4F BLSR yet. In addition, certain incomplete rings are upgradeable.

If the ring is not upgradeable, an error message is displayed in block 605. Alternatively, in block 604, a selection of reversion time is received, and in block 606, a selection of ports is received. In block 608, the provisioning data is verified. In one embodiment, blocks 604, 606, 608 are implemented using panels that are generated by a wizard having a format similar to the panels of FIG. 3A, FIG. 3B, and FIG. 3C.

In block 612, provisioning of the upgraded ring is automatically performed. Block 612 may involve performing one or more tests or checks, calling an upgrade method for data structures that represent the ring, and assigning protection ports to network nodes that participate in the ring. If a failure occurs, a dialog is presented to the user describing such failure.

2.4 Ring Edit Window

Figure 3D:
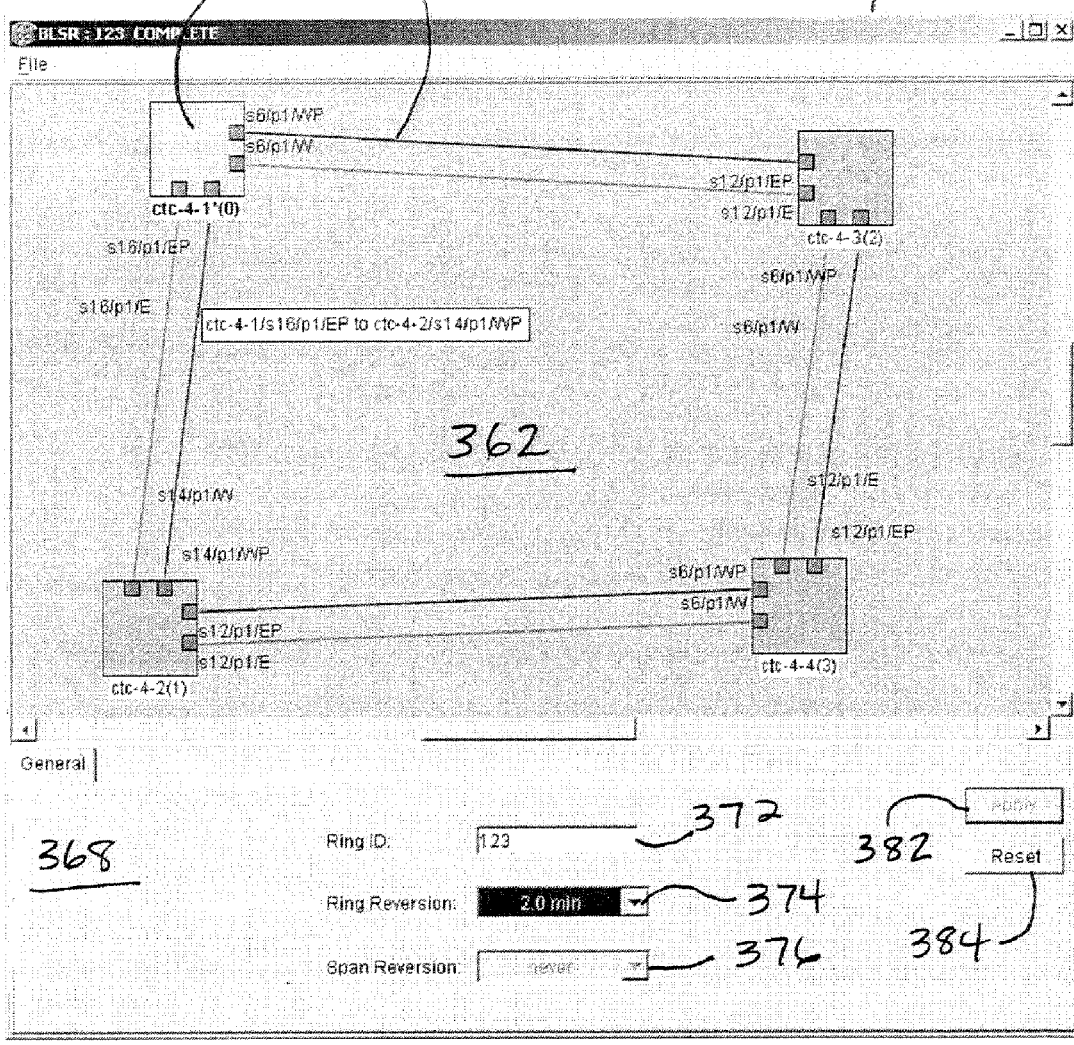
FIG. 3D is a screen display diagram that may be used to provide a ring edit window.

In one embodiment, selecting Edit button 238 of FIG. 2B enables a user to edit values associated with a previously created ring. In response, in one embodiment, a Ring Edit window is displayed to receive edited values. FIG. 3D is a screen display diagram that may be used to provide a ring edit window. Screen display 360 includes an interactive map 362 and a provisioning pane 368.

In one embodiment, a user can open several ring edit windows concurrently for different rings. Each ring is shown in only one ring edit window at a time. Thus, if a particular ring is shown in one ring edit window, attempting to edit the same ring causes the corresponding ring edit window to pop up in the user's display in a foreground position.

The interactive map 362 shows nodes 364 and DCC links 366 that are part of the ring. For both 2F and 4F BLSRs, protect ring spans are shown. Display of a protect span in a 2F BLSR is a logical representation of the protect span, as working spans and protect spans in 2F BLSRs share the same physical fiber. A label on each node 364 provides the node identifier of the node. By right clicking on the node icon, the user may change the node identifier. Further, right clicking on a port graphic enables a user to perform BLSR switching. The current state of a BLSR trunk port is reflected on the port graphic using a letter. For example, a letter C inside the box indicates CLEAR; other similar operations and indications are FORCE RING (F), LOCKOUT SPAN (L), etc. EP indicates east protect port, W indicates west port, etc., and appear at the end of a link. These actions are immediate, in that a user need not select an Apply button to make the actions occur.

The provisioning pane 368 allows the user to change general network-level parameter values associated with the ring. For example, a Ring ID field 372 accepts a revised or new ring identifier. A Ring Reversion drop-down menu 374 accepts a revised or new ring reversion time value. A Span Reversion drop-down menu 376 accepts a revised or new span reversion time value for 4F rings. When screen display 360 is first displayed, all then-current values of parameters are displayed in Ring ID field 372, Ring Reversion drop-down menu 374, and Span Reversion drop-down menu 376. If new values are entered, selecting Apply button 382 causes the new values to take effect.

2.5 Other Wizards and Feature Extensions

In another embodiment, an Add Node Wizard may be provided that is accessible from the Ring pane or Provisioning pane of FIG. 2B through a button, such as the Add button. The Add Node Wizard assists a user in performing steps required to add a node to an existing BLSR ring using a process similar to that described herein for the span upgrade wizard.

In one specific embodiment, an Add Node Wizard comprises six panels. In a first panel, the wizard recommends that the user provision SDCC on the new node on the two (or four) OC-N ports that will be used to connect to the ring. In a second panel, a network topology map is displayed, showing the existing ring, and the user is prompted to indicate where to insert a new node. Thus, the user may select which span to "cut." In a third panel, the wizard warns the user that the wizard will perform the necessary switch operations to switch traffic away from the span where the new node is added. The wizard may display the ports that will be affected. In a fourth panel, if port switching was successful, an acknowledgment message is displayed, and the user is prompted to reconnect the fibers and select Next when reconnection is complete.

In a fifth panel, the topological map is displayed with all eligible nodes and links for the user to select. That is, eligible nodes must be connected through an eligible DCC link to any of the two adjacent nodes where the insertion occurs. Selection of the DCC link to use is performed graphically. In a sixth panel, the wizard presents a warning to the user that the switches on the two non-adjacent nodes will be cleared.

In another alternative embodiment, a Remove Node Wizard is provided, and is accessed from the ring edit window, e.g., FIG. 3D. The Remove Node Wizard assists a user to perform steps required to remove a node from an existing BLSR. In one specific embodiment, to activate the Remove Node Wizard, a user can select a node to remove by right clicking on the node from the map in the ring edit window. In response, a pop-up menu is displayed that includes a "Remove node . . . " menu item. Selecting the "Remove node . . . " menu item activates the wizard.

The Remove Node wizard may comprise three panels. In a first panel, the user is warned that the network management system will perform the switch operations necessary to switch traffic away from the node that will be removed. The warning may also specify that circuits that add or drop at this node will not work thereafter. The warning may also display the ports that will be affected. In a second panel, the wizard reports that traffic has been switched successfully and prompts the user to reconnect the fibers and press Next when done. In a third panel, the wizard removes BLSR provisioning from the node which was removed, checks the status of DCC links, and warns the user that all switches will be cleared.

2.6 Network Element Discovery

Figure 4A:
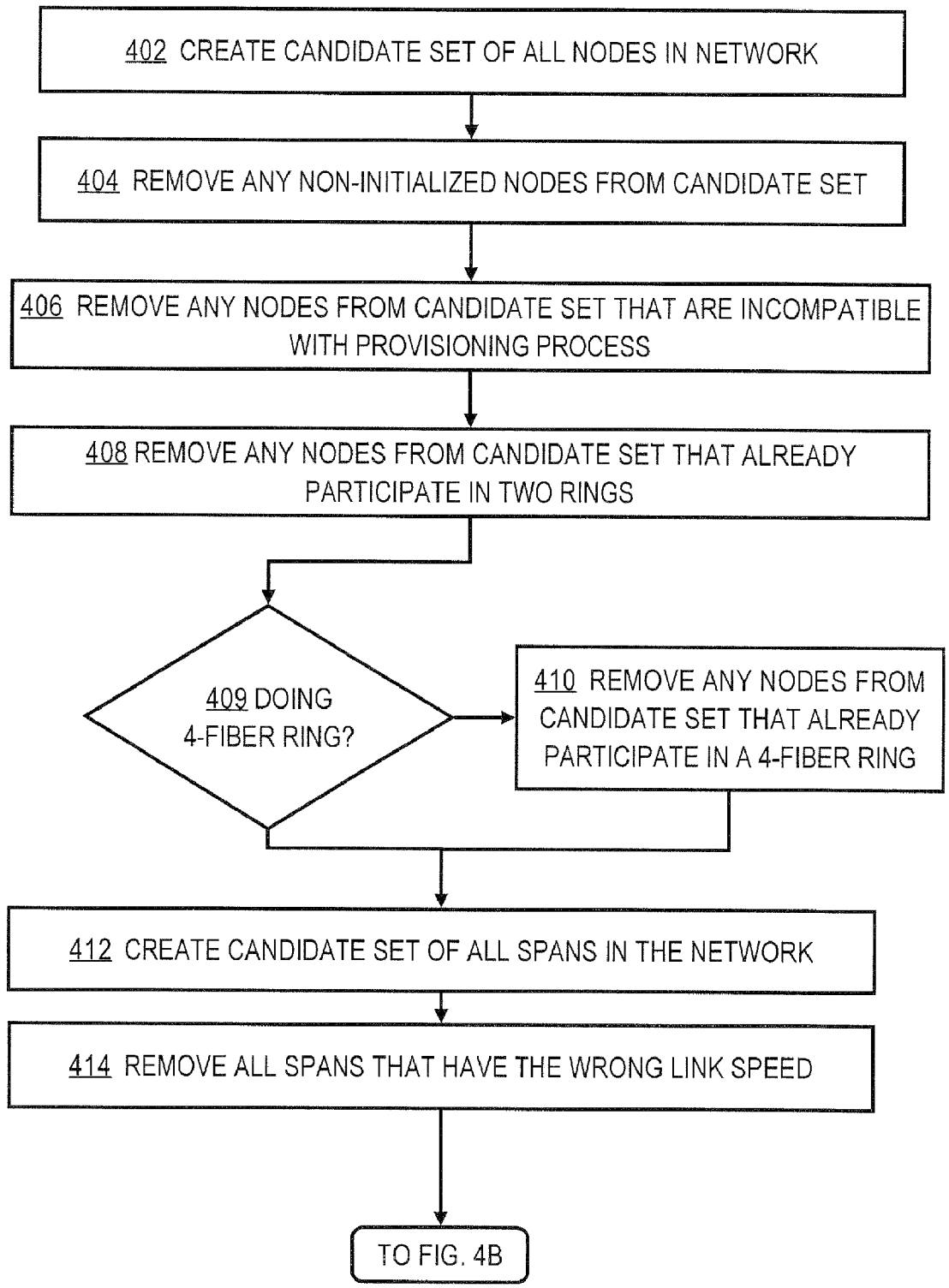
FIG. 4A is a flow diagram of a process of network element discovery.
Figure 4B:
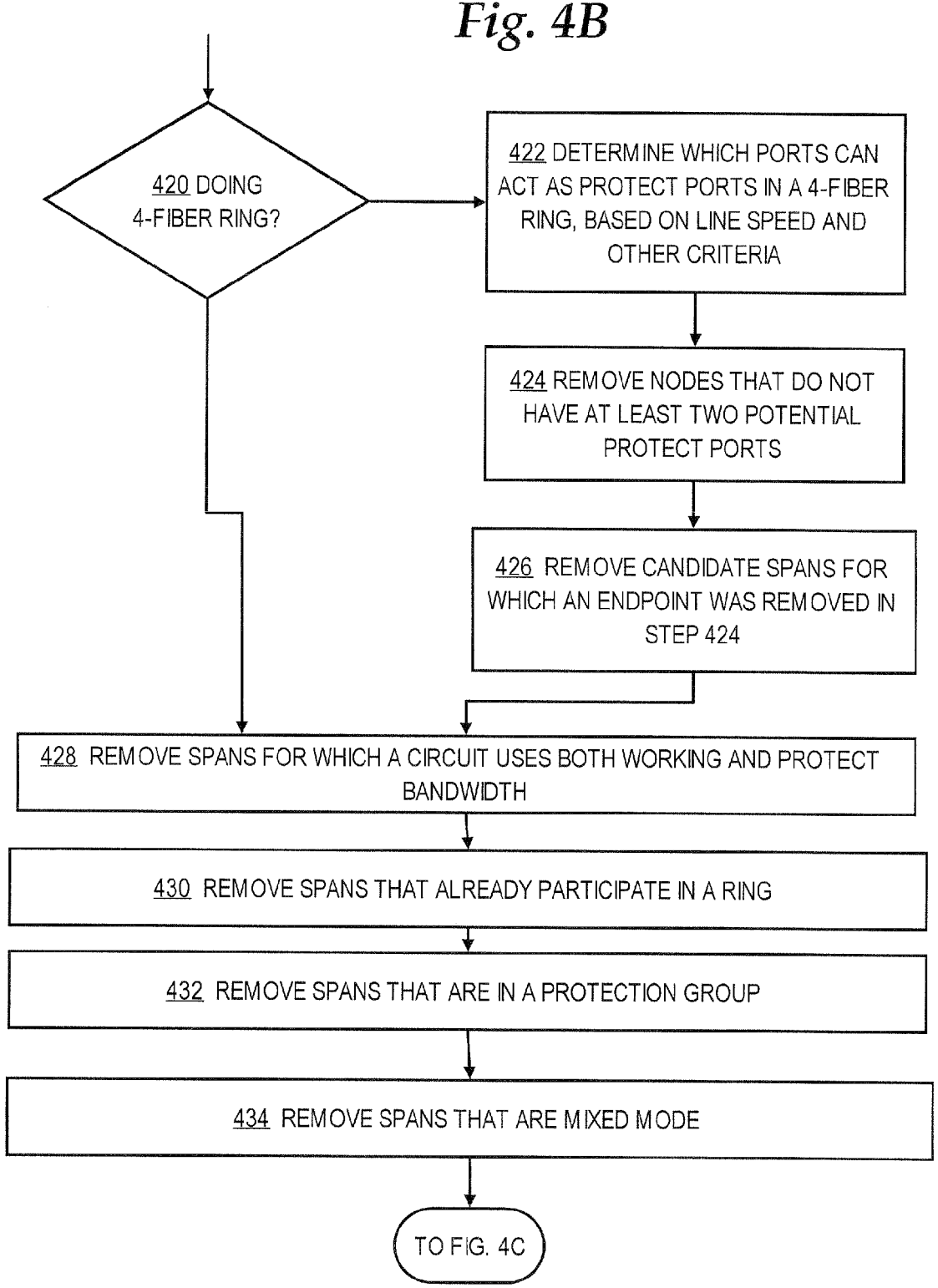
FIG. 4B is a flow diagram of further steps in the process of FIG. 4A.
Figure 4C:
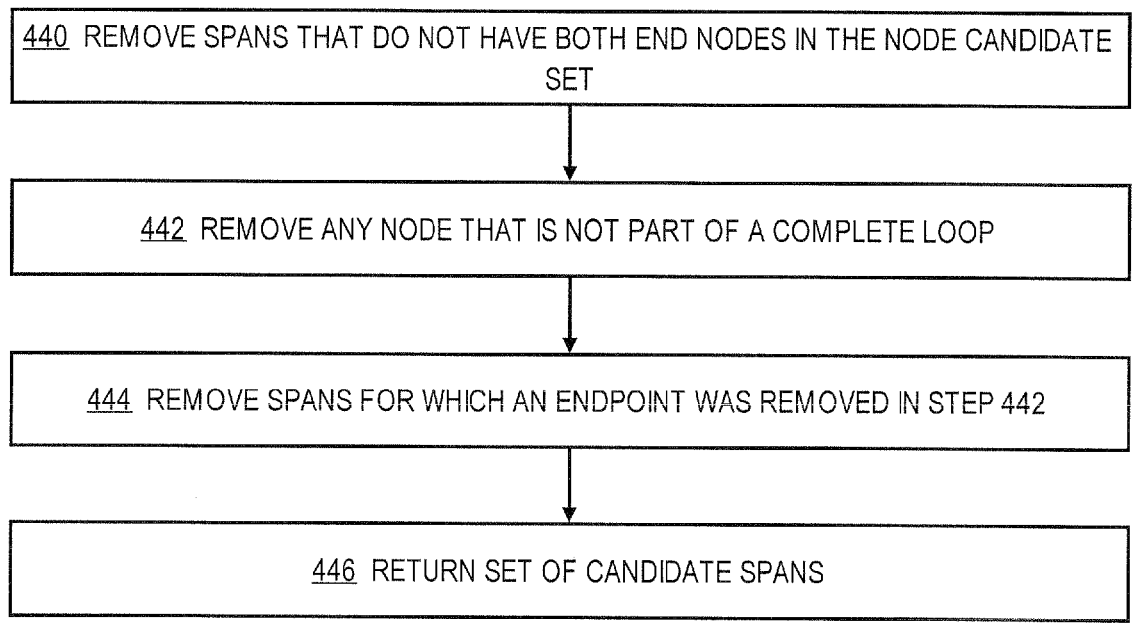
FIG. 4C is a flow diagram of further steps in the process of FIG. 4A.

FIG. 4A is a flow diagram of a process of network element discovery. FIG. 4B and FIG. 4C are flow diagrams of further steps in the process of FIG. 4A. In general, the process of FIG. 4A, FIG. 4B, and FIG. 4C provides a way to determine which network nodes and spans are capable of participation in a BLSR. In one embodiment, the process of FIG. 4A, FIG. 4B, and FIG. 4C can be implemented in software that initializes a class BlsrRingModel. After the process is applied, the BlsrRingModel class is aware of the candidate nodes, spans, and protect ports that could potentially participate in a BLSR. The potential candidates are determined by examining information in a parameter BlsrRingInfo that is passed to the BlsrRingModel class.

Figure 5A:
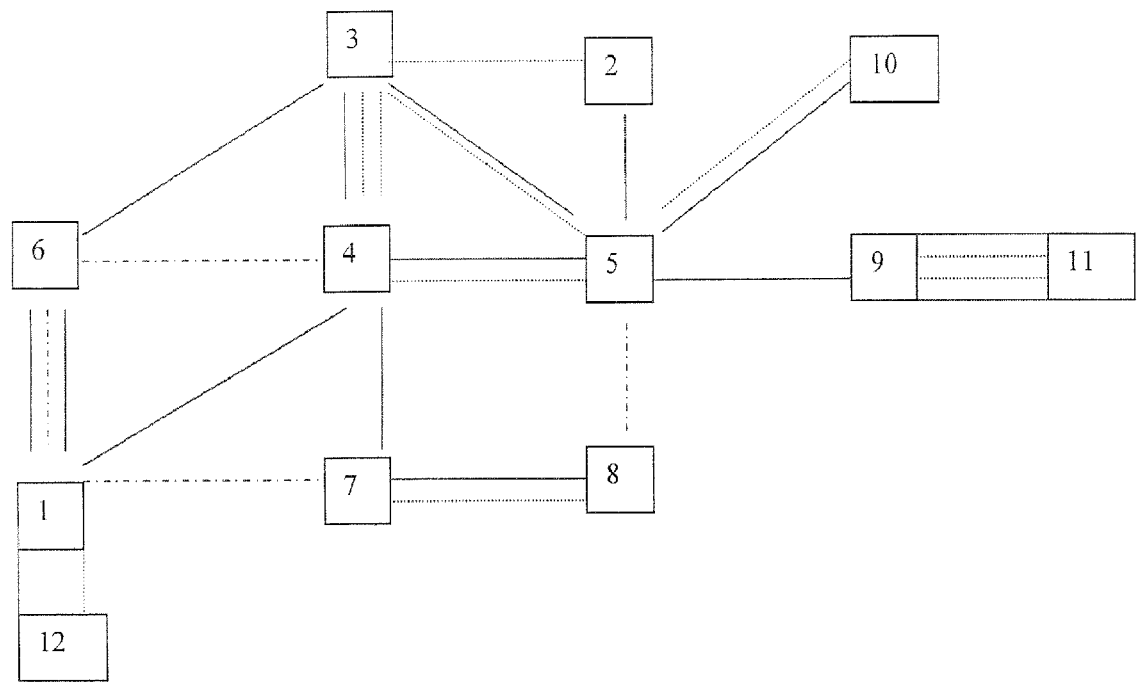
FIG. 5A is a graph of a hypothetical network.
Figure 5A:

For purposes of illustrating a clear example, operation of the process of FIG. 4A, FIG. 4B, and FIG. 4C is described herein with respect to a hypothetical network to discover the candidate elements for a four fiber OC-48 ring. FIG. 5A is a graph diagram of a hypothetical network consisting of network elements 1 through 12. Each such network element may be an optical switch, such as a Cisco 15454. Spans of OC-48 speed or other speeds, as indicated by respective lines, connect nodes. Links that are not OC-48 are used to describe the discovery process below.

Referring first to FIG. 4A, in block 402, candidate set is created that initially contains all nodes in the network. In block 404, any non-initialized nodes are removed from the candidate set. Nodes that are not initialized are not accepting configuration requests, and are not included in the candidate set for purposes of determining eligibility to participate in a BLSR.

In block 406, any nodes in the candidate set that are incompatible with the provisioning process are removed. In one embodiment, block 406 involves creating a set that contains only nodes in the network that provide the functionality required for BLSR filtering, namely that a correct software image is present on the nodes. Assume that for the network of FIG. 5A, this yields candidate nodes 1-12.

Optionally, at this point, the process may determine whether proper security permissions exist on all nodes.

In block 408, each node in the list of candidate nodes is interrogated to determine the current number of BLSRs in which it participates. If a node participates in two BLSRs, the node is removed from the candidate list. In block 409, a test is performed to determine whether the process is seeking to construct a 4F BLSR. If so, and the node already participates in a 4F BLSR, then that node is eliminated from the candidate node set.

In block 412, a candidate set of all spans in the network is created. For the network of FIG. 5A, this yields the following set of candidate spans:

[1-4], [1-6], [1-6], [1-6], [1-7], [1-12], [2-5], [3-4], [3-5], [3-6], [4-5], [4-6], [4-7], [5-8], [5-9], [5-10], [7-8], [9-11], [9-11].

In this description, members of the preceding set are termed working spans or simply spans.

In block 414, all spans that have the wrong link speed are removed from the candidate set of spans. For the network of FIG. 5A, for example, all spans that are not OC-48 spans are removed; thus, an OC-12 span would be removed from the candidate list. Thus, the following spans would be removed:
[1-6], [1-7], [4-6], [5-8]

and the list of candidate spans would now be:
[1-4], [1-6], [1-6], [1-12], [2-5], [3-4], [3-5], [3-6], [4-5], [4-7], [5-9], [5-10], [7-8], [9-11], [9-11]

Referring now to FIG. 4B, in block 420, a test is performed to determine whether a 4F BLSR is under construction. If so, then in block 422, the process determines which ports can act as protect ports in a 4F BLSR. The determination of block 422 may be made based on line speed and other criteria. For example, the process may select only ports that have line speed of OC12, ports that are in service, ports that are not participating in circuits, etc. In block 424, nodes that do not have at least two potential protect ports are removed from the nodes list. In block 426, candidate spans are removed from the candidate list if the source endpoint or destination endpoint of the span was removed in block 424.

In block 428, spans for which a circuit uses or "straddles" both the working and protect bandwidth are eliminated. If the circuit is merely occupying the protect region but none of the working region, then a warning message may be issued to inform the user that the circuit will lose protection and become a Protect Channel Access (PCA) or "extra traffic" circuit. This approach allows a protect region to be used for data, although such circuits are unprotected.

In block 430, spans that already participate in a BLSR are removed. In block 432, spans that are in a protection group are removed. In block 434, spans that are "mixed mode" are removed from the candidate list. In this context, a "mixed mode" span has a SONET network element on one side and an SDH network element on the other side; typically this occurs in spans that connect optical switches in different countries or regions, where SONET is used in one region for inter-switch communication and SDH is used in the other.

Referring now to FIG. 4C, in block 440, spans that do not have both source and destination end nodes in the node candidate set are removed from the span candidate set. This eliminates spans between nodes that participate in too many BLSRs or that do not have the correct software load. In the case of FIG. 5A, the list of working spans provided above remains unchanged.

In block 442, any node that is not part of a complete loop is removed. In block 444, the process removes from the span candidate list any span for which an endpoint was removed in step 442. In block 446, the then-current sets of candidate nodes and spans are returned. Applying the foregoing process to the example of FIG. 5A would result in sets of nodes and spans that define the graph shown in FIG. 5B.

If a 4-fiber BLSR is being built, the process of FIG. 4A-FIG. 4C may be extended to draw non-DCC spans for the user to select using the GUI. In such an extension, the following process is performed.

Figure 5B:
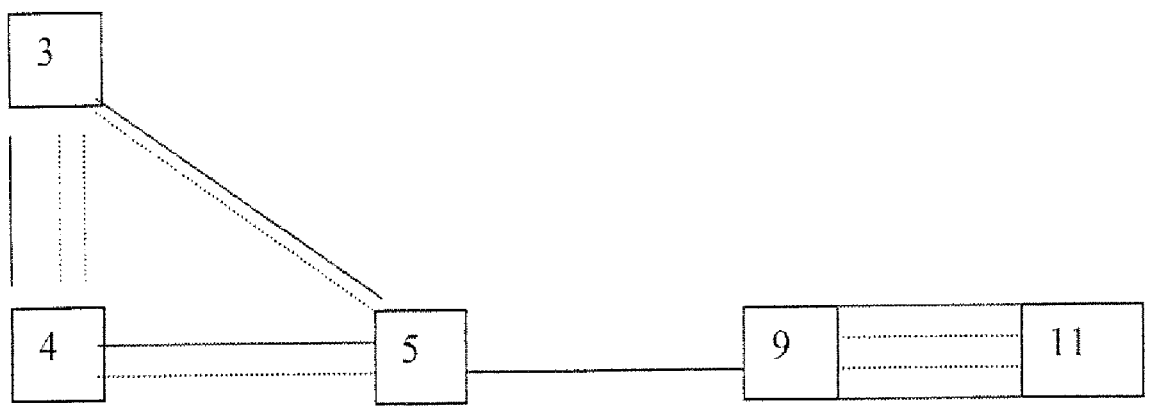
FIG. 5B is a graph of the network of FIG. 5A after removal of certain nodes and spans.

1. Turn SDCC on all the remaining ports in the protect ports list and discover via OSPF what nodes are connected to each other. The list of protect spans is: [3-4], [3-4], [3-5], [4-5], [9-11], [9-11].
2. For each port for which SDCC was turned on, turn it off.
3. For each protect span, verify that at least one corresponding working span exists. If no match is found, remove the protect span from the protect spans list.
4. For each working span, verify there is at least one corresponding protect span. In the example of FIG. 5A-5B, the following working spans do not have a corresponding protect span: [5-9]. Accordingly, the list of working spans is reduced by removing this span, yielding the following list: [3-4], [3-5], [4-5], [9-11], [9-11].
5. For each node, verify that it still is part of a complete loop (of working spans) and that it participates in a loop made up of the protect spans. If it doesn't, remove the node from the list.
6. For each working span and each protect span remove the working span or protect span if one of their endpoint nodes was removed in step 5.

Figure 5C:
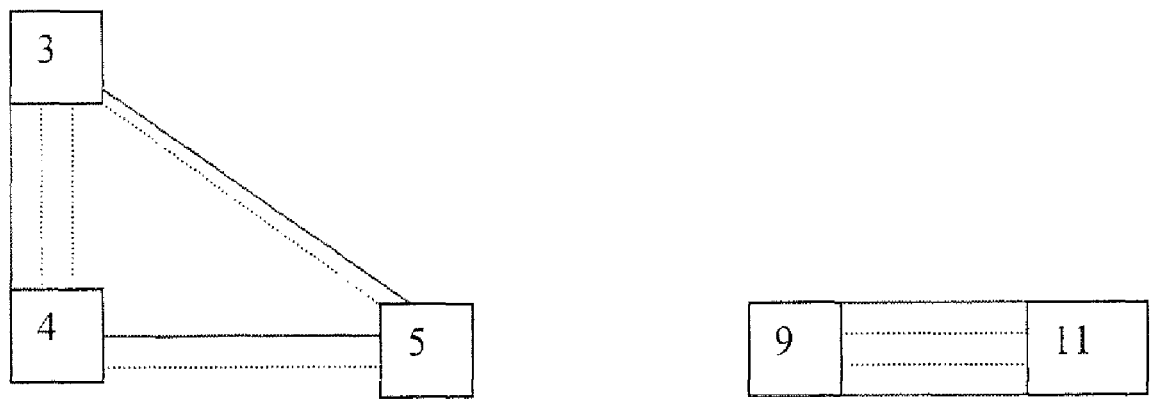
FIG. 5C is a graph of the network of FIG. 5A after removal of certain other nodes and spans.

The resulting candidate sets of nodes and spans may be returned. In the example given, the resulting candidate sets would yield a graph as shown in FIG. 5C.

3.0 Implementation Mechanisms—Hardware Overview

Figure 7:
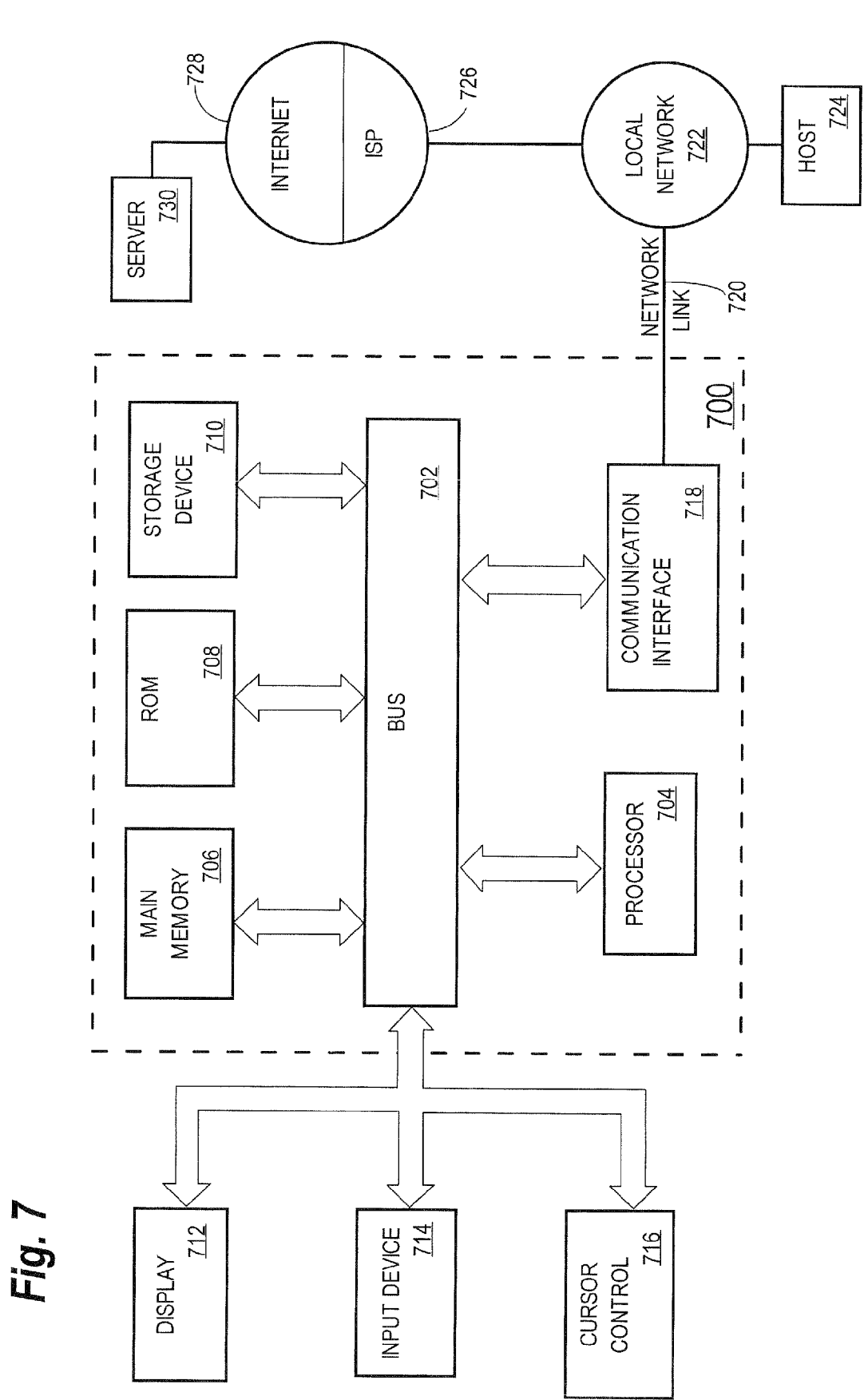
FIG. 7 is a block diagram of a computer system upon which an embodiment may be implemented.

FIG. 7 is a block diagram that illustrates a computer system 700 upon which an embodiment of the invention may be implemented. Embodiments may be implemented using general-purpose computer systems augmented with infrastructure technologies such as CORBA and Java®. For example, a CORBA object broker may be used as an interface to a management system. Alternatively, a legacy management interface such as TL1 or non-object-oriented programming languages such as C may be used.

Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for managing a plurality of network elements in a service provider network using a network-level approach. According to one embodiment of the invention, managing a plurality of network elements in a service provider network using a network-level approach is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for managing a plurality of network elements in a service provider network using a network-level approach as described herein.

The received code may be executed by processor 704 as it is received, and/or stored in storage device 710, or other non-volatile storage for later execution. In this manner, computer system 700 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX A

Class Definitions

BlsrRingModel:

This class would represent a BLSR Ring. It would contain a reference to all the IBlsrModels contained in the Ring. All the IBlsrModels in the ring would have the same ring Id. The responsibilities of the class would be the following:
1. Respond to addition an deletion of the IBlsrModels it contains and recompute the state accordingly. It would do so by registering for updates with all the IBlsrModels it contains to listen for changes in BlsrId
2. Handle changes in BlsrId and NodeIds of the IBlsrModel by deleting the IBlsrModel from itself and passing the IBlsrModel to the BlsrRingManager class to create a new BlsrRingModel or add it to an existing Ring.
3. Handle deletion of the BlsrRing by passing the delete message to all the IBlsrModels involved in the Blsr Ring.
4. Handle the possibility of a Node being disconnected when a ring is being deleted (because the ring is in INCOMPLETE state).
5. Provide an interface to validate a Blsr, i.e. force a check to see if the ring is complete or incomplete
6. Provide an interface to add spans to the ring
7. Provide an interface to set the ports for protect spans (not DCC connected) for 4F Blsr
8. Contain a list of BlsrNodes (and thus IBlsrModels that exist) that form the ring
9. Contain a list of BlsrSpans (and thus the INetLink objects that represent them) that are the spans for the ring The BlsrRingManager class creates and destroys BlsrRingModel objects by observing ElementModels for new and destroyed IBlsrModels. The manager also bears responsibility for adding/removing the new/destroyed IBlsrModels to the appropriate BlsrRingModel (stitching).

The BlsrRingModel is an observer of its IBlsrModels. It observes for changes in its IBlsrModels, which could result in a state change, or perhaps even purging it from the current model and having the BlsrRingManager reassign it (a change in the IBlsrModel's ring id for example).

The BlsrRingModel has the following states:

Incomplete:

As IBlsrModels are discovered and added to the appropriate BlsrRingModel, via the observing BlsrRingManager (this is documented in the BID algorithm) the BlsrRingModel will be in the incomplete state until it forms a complete loop. From the incomplete state if the ring does not, or will not, discover its way to the complete state it may be deleted. Editing cannot be done on an incomplete ring.

Complete:

If we are in the complete state then this BlsrRingModel forms a complete loop. It is possible for the BlsrRingModel to return to an incomplete state upon the BlsrRingManager realizing that one of its IBlsrModels has died. From this state the BlsrRingModel can enter the editing state.

Creating:

The creating state is kicked off by the GUI and directly uses the network element discovery algorithm described elsewhere in this document. To start this process off the GUI will request, from the BlsrRingManager, a new and empty BlsrRingModel. As the user adds spans, removes spans, reverses spans etc, temporary structures are created. When these temporary structures pass a sanity check provisioning will be allowed. From the creating state the BlsrRingModel enters the complete state, however in rare cases the ring to enter the incomplete state. We will use a similar mechanism as Circuit Creation uses to try to prevent this from happening. However, if it does happen, the user can still recover by deleting the ring and recreating it.

Deleting:

BlsrRingModels can be sent into the deleting state from the complete state or the incomplete state. In this state the BlsrRingModel will attempt to delete all underlying IBlsrModel's. In the event some IBlsrModels throw exceptions, which prevent their deletion no attempt to rollback will be made. If the CTC is shut down during this process, the undeleted IBlsrModels will be shown as one or more INCOMPLETE BlsrRingModels and can be deleted later. In this state the BlsrRingModel stops listening for updates from its IBlsrModels.

BlsrRingManager

This class would represent the collection of all Blsr's for the network. Since it is possible for multiple rings with the same ring ID to exist in the network of elements, the BlsrRingManager has the responsibility of determining which BlsrRingModel a given IBlsrModel belongs to. This is, in effect, the first part of the "stitching" or "splicing" process. The following are the list of responsibilities for the class:

1. Maintain a current collection of all the IBlsrModels for all nodes, this would be done by registering for updates with all ElementModels to be informed whenever a BlsrModel gets added to a Node.
2. Maintain a reference to all the Nodes in the Network (by listening to the NetworkModel) and add the ElementModels of any new node that comes up which "Provides" the BLSR_WIZARD feature.
3. Stitch the list of BlsrModels retreived from the ElementModels to create BlsrRing, based on RingId
4. Provide an interface for creation of BlsrRingModel
5. Handle changes in BlsrId and NodeIds of the IBlsrModel by deleting the IBlsrModel from itself and passing the IBlsrModel to the BlsrRingManager class to create a new BlsrRingModel or add it to an existing Ring.

BlsrUtilities

This class would provide utilities to filter out the list of nodes or spans. This class might not be necessary if we include the functionality in BlsrRingManager, but it would be nice to move the filters etc. to a separate class. The responsibilities of this class would be.

1. Provide API to filter the list of NetLinks which are capable of being a part of a give BLSR ring type (OC48, OC192, 2F or 4F) for a given network. These BlsrSpans would provide the gui with the Model to draw the network Map
2. Provide other filters as needed by the Network model layer NOTE: Based on the latest changes to the design, the BlsrUtilities class may no longer be necessary as the filtering is done by the BlsrRingModel class.

Implementation Notes

Usage for BlsrRingModel Class:
    The gui will call BlsrRingManager.createBlsrRingModel (BlsrRingInfo ringInfo) to get a new BlsrRingModel object
    Then BlsrRingModel.getPotentialWorkingSpans( ) will be called—this returns an array of BlsrSpan objects (which have null INodeModels in them initially). The INetLink objects in these will be used to populate the map (map nodes will be assumed by the links)
    Now the user will have the ability to select a MapLink and click the "Add Span" button. This will call BlsrRingModel.addSpan( )—see below
    The user can also select a span and click the "Reverse" button which will call BlsrRingModel.reverseSpanDirection(BlsrSpan)
    Finally, the user can click "Remove" which will remove the span from the BlsrRingModel by calling BlsrRingModel.removeSpan(BlsrSpan)
    The user continues to add, reverse, and remove spans until the is LoopComplete( ) method returns true which causes the "Next" button to get enabled.

BlsrNode:
    This object is instantiated by the BlsrRingModel class during the creation of a BLSR.
    Constructor sets all member variables to null
    boolean is WorkingDirectionSet( )—returns true if either eastMain or westMain are non null. This indicates that this node is already connected to another link with direction so there is already an implied direction that must be set on any new span that gets added as a working span.
    boolean is ProtectDirectionSet( )—returns true if there either of the protect ports are non-null. This means that for this node, there is already an implied direction that must be set on any new span that gets added as a protect span.
    getters/setters for links—this node has links associated to it's east and west sides (and protection)

Are methods that simply set which links are associated with those logical sides.

BlsrSpan:
The BlsrRingModel class constructs this object while creating a BLSR using the BED algorithm (see below).
This is similar to INetLinkSpan except without the circuit stuff . . . .

Constructor sets the INetLink and finds the reverse INetLink and sets them appropriately
  Initially the INodeModels are all null indicating that the link does not have a direction set (it isn't even in a BlsrRingModel yet). Also, the workingSpan variable is a constructor parm because it will either be created from a Network discovered INetLink object or from the NonDccLink that is created when the user selects the ports and the fiber is (optionally) verified so it will be known.
  The getters and setters are self-explanatory but the way to think about which INodeModels are which is this:
  The INodeModel that will have this span as it's East side will be the value in getEastSide( )
  The direction for the protect span is assumed to be the same as the direction for the previously selected working span between these two nodes.

NonDccLink:
  Contains the IsonetPortModels which represent the ports contained in the non-DCC link which will be used as the protect span in the BLSR.
  Created when the user selects the ports that will represent this span BlsrRingModel algorithms:
  Constructor
    At construction time, the BlsrRingModel is passed a BlsrRingInfo object which tells it the ring id, ring speed, ring type (2F or 4F), ring reversion and span reversion times.
    Next, the gui will call getPotentialWorkingSpans( ) which will cause the BlsrRingModel to "discover" the appropriate INetLink objects
    BlsrRingModel should keep a list (set) of these objects (working spans) when they are created
    The BlsrRingModel will also maintain a list of BlsrNodes that are in the BlsrRingModel
  BlsrRingInfo getBlsrRingInfo( )—simple getter
  int getState( )—returns the state of this BlsrRingModel (CREATING, EDITING, COMPLETE, etc)
  private void changeState(int newState)—internal private method to change the state as appropriate
  BlsrSpan[ ] getPotentialWorkingSpans( )|—This is described elsewhere . . . (see the BED algorithm)
  boolean is LoopComplete( ) returns true if we can go from an arbitrary optical port in the ring on a node following the spans all the way back to the initial node again along the working spans. This is how the gui determines when to enable the "Finish" button in the wizard
  void reverseSpanDirection(BlsrSpan span):—called when the user selects a span and clicks "Reverse" swap the eastSide and westSide in the span and then call reverseSpanDirection(this, INodeModel) for each side
  void reverseSpanDirection(BlsrSpan span, INodeModel node)
    This will assume that the span has the correct direction information and the INodeModel is incorrect.
    Change (swap) the direction information in the BlsrNode for that INodeModel,
    Follow the spans and nodes swapping the information until you reach the end or get back to where you started (or cannot follow the path any longer)
  addSpan(BlsrSpan span):
    Check the working span list, otherwise check the protect span list to see if the list already contains this span
    if it does, just return
    if this span is number 15 (or 31 in the extended ring case) and is LoopComplete returns false, throw an exception—cannot complete the ring
    if this ring has more than 15 spans (implies more than 16 nodes) then we should make sure to set the extendedRing attribute to true when provisioning the BlsrModels.
    See if the two nodes on the ends of this span are already known because if they WERE found, they probably already have a direction set so we need to check if this link fits
    At this point there are three possibilities:
      1) They are both null—meaning that neither node had already been seen
      create the BlsrNode objects, add the span (lower port is WEST) and set all node variables appropriately on both nodes
      add both BlsrNode objects and the BlsrSpan object to the appropriate lists
      call tryToAddNextSpan( . . . ) on both sides
      2) One side is null—meaning that one node was already seen and the direction can be set based on that one
      create the other BlsrNode, set variables appropriately, add the node and the span to the lists
      call tryToAddNextSpan on the side that the BlsrNode was just created for
      3) Both sides are not null—this is a little tricky—it either fits (easy) or it doesn't (harder)
    Add the BlsrSpan object to the list of BlsrSpans
    Check if it fits (east and west match up)—if it does just set span variables accordingly
    If it does not, chose the East vs West based on lower port=WEST and then call reverseSpanDirection (BlsrSpan, INodeModel node) where parameters are "this" and the node that is on the side that is wrong based on the newly decided direction of this span
  removeSpan(BlsrSpan):
    remove the BlsrSpan from the list of spans, set appropriate variables to null in the respective BlsrNode objects
  boolean is UpgradeableToFourFiber( )
    returns true if the BlsrRing is in COMPLETE state AND the BlsrRing is OC48 or OC192 AND each IBlsrModel in the ring is also upgradeable.
  sanityCheck:
    runs through a sanity check to see if we can still provision the BlsrModels on the nodes like the user has selected
  provision:
    spawns the threads to actually provision the BlsrModels on the nodes (via ElementModels class possibly using JobController classes as well like the circuit creation code does)
  dispose:
    get rid of unnecessary references
  (optional) private void tryToAddNextSpan(BlsrSpan blsrSpan, BlsrNode BlsrNode)
    This may have been started in both directions, so synchronize it so we don't have trouble
    if span is eastSide for node, try to add west and vice versa
    if we are looking for the west side check to see if it is already chosen. If it is, return if it is not, search through the list of potentialWorking-
Spans to see if there is one and only one that will work.
If there is, call addSpan( ) to add it (this, in turn, may call
this method again)
Otherwise, return
What is claimed is:

1. A data processing apparatus, comprising:
a processor;
a computer-readable storage media storing one or more
sequences of instructions which when executed by the
processor causes the processor to perform:
receiving first user input specifying a plurality of ring
attribute values that define attributes of a bi-directional
line switched ring for provisioning on network elements
of one or more non-connected sub-networks;
receiving second user input specifying one or more work-
ing spans for the bi-directional line switched ring;
automatically configuring each of the network elements to
participate in the bi-directional line switched ring based
on the ring attribute values;
determining whether the ring attribute values specify a
4-fiber bi-directional line switched ring (BLSR);
receiving third user input specifying a selection of ports for
protect spans when the ring attribute values specify a
4-fiber BLSR;
displaying a list of one or more BLSRs that are then-
currently provisioned in a service provider network,
wherein each of the BLSRs is associated with a ring
identifier value;
receiving a selection of one of the BLSRs in the list;
generating and displaying a network topology display that
includes only those network elements of the service
provider network that participate in the selected BLSR.

2. The apparatus of claim 1, wherein the first user input
specifies a span speed, ring identifier, and ring reversion time
value for a BLSR.

3. The apparatus of claim 1, wherein the instructions which
when executed cause receiving the second user input further
comprise instructions which when executed cause:
generating and displaying a network topology display that
includes only those network elements and spans of the
service provider network that are capable of participat-
ing in the BLSR;
receiving user input representing a selection of one of the
spans for use in the BLSR.

4. The apparatus of claim 1, wherein the instructions which
when executed cause receiving the second user input further
comprise instructions which when executed cause:
discovering a first set of all network elements in the service
provider network that are capable of participating in the
BLSR;
discovering a second set of all spans in the service provider
network that are capable of participating in the BLSR;
generating and displaying a network topology display that
includes only network elements that are in the first set
and only spans that are in the second set.

5. The apparatus of claim 1, wherein the instructions which
when executed cause receiving the second user input further
comprise instructions which when executed cause:
discovering a first set of all network elements in the service
provider network that are capable of participating in the
BLSR;
discovering a second set of all spans in the service provider
network that are capable of participating in the BLSR;
generating and displaying a network topology display that
includes only network elements and spans that are in the
first set and second set;
receiving second user input representing a selection first
span for use in the BLSR;
automatically identifying, based on the first set, second set,
and second user input, one or more additional spans,
which, in combination with the selected first span, form
the BLSR.

6. The apparatus of claim 1, further comprising instruc-
tions which when executed cause:
determining a port orientation for a first port of a first spans
in the BLSR; and
based on the selected port orientation, automatically deter-
mining a plurality of other port orientations for all other
spans in the BLSR.

7. The apparatus of claim 4, wherein the instructions which
when executed cause discovering a first set of all network
elements in the service provider network that are capable of
participating in the BLSR comprise instructions which when
executed cause:
creating and storing a node candidate set having members
that represent all nodes in the network;
removing, from the node candidate set, members that rep-
resent any nodes that are incompatible with BLSR pro-
visioning, that already participate in two BLSR rings, or
that are not part of a complete loop.

8. The apparatus of claim 4, wherein the instructions which
when executed cause discovering a second set of all spans in
the service provider network that are capable of participating
in the BLSR comprise instructions which when executed
cause:
creating and storing a span candidate set having members
that represent all nodes in the network;
removing, from the span candidate set, members that rep-
resent any spans that have a wrong link speed, for which
a circuit uses both working and protect bandwidth, that
already participate in a BLSR, that are in a protection
group, or that are mixed mode.

9. A system for creating and storing troubleshooting infor-
mation for automatically provisioning a bi-directional line
switched ring (BLSR) using a plurality of network elements
in a service provider network, comprising:
one or more processors;
a network management module configured to be commu-
nicatively coupled to the service provider network and
configured to receive one or more packet flows from the
plurality of network elements;
a ring creation wizard stored within the network manage-
ment module and configured to initialize a new BLSR;
a topological map stored within the network management
module and configured to visually depict, using the one
or more processors, the physical locations of the plural-
ity of network elements relative to each other;
a table, accessible through the topological map, configured
to list all current BLSRs within the service provider
network; and
a network view selector with function tabs configured to
select specific network management functions;
wherein the network management module is configured to
control multiple non-connected sub-networks, and pro-
vision multiple network elements concurrently and
automatically;
a BLSR setup wizard configured to display a plurality of
network nodes located in a ring, where each of the plu-
rality of nodes comprises a network switch device and
the nodes may be located in multiple non-connected
sub-networks; wherein each node is communicatively
coupled to a neighbor node by one of a plurality of
working spans;

wherein the BLSR setup wizard further comprises a mechanism for filtering the plurality of working spans and configured to provide a selection process that only presents to a user working spans that are actually usable in a ring.

10. The system of claim 9, wherein the table further comprises a nodes column configured to identify all nodes within a specific BLSR using a node identifier.

11. The system of claim 9, wherein the table further comprises a state column configured to indicate a state of a specific BLSR, wherein the state can be any one of complete, incomplete, creating, or editing.

12. The system of claim 9, wherein the function tabs further comprise a provisioning tab configured to display a network-level BLSR pane which contains a table that lists all then-current BLSR rings within the network.

13. The system of claim 9, further comprising a ring ID field configured to receive a unique identifier for the ring to be created and where each ring identifier is an integer, and where a warning is displayed if a user requests a ring identifier that is already in use.

14. A computer-readable storage medium storing one or more sequences of instructions which, when executed by one or more processors, causes the one or more processors to perform:

receiving first user input specifying a plurality of ring attribute values that define attributes of a bi-directional line switched ring for provisioning on network elements of one or more non-connected sub-networks;

receiving second user input specifying one or more working spans for the bi-directional line switched ring;

automatically configuring each of the network elements to participate in the bi-directional line switched ring based on the ring attribute values;

determining whether the ring attribute values specify a 4-fiber BLSR;

receiving third user input specifying a selection of ports for protect spans when the ring attribute values specify a 4-fiber BLSR;

displaying a list of one or more BLSRs that are then-currently provisioned in a service provider network, wherein each of the BLSRs is associated with a ring identifier value;

receiving a selection of one of the BLSRs in the list; and generating and displaying a network topology display that includes only those network elements of the service provider network that participate in the selected BLSR.

15. The computer-readable storage medium of claim 14, wherein instructions which when executed cause receiving the second user input further comprise instructions which when executed cause:

generating and displaying a network topology display that includes only those network elements and spans of the service provider network that are capable of participating in the BLSR;

receiving user input representing a selection of one of the spans for use in the BLSR.

16. The computer-readable storage medium of claim 14, wherein receiving the second user input further comprise instructions which when executed cause:

discovering a first set of all network elements in the service provider network that are capable of participating in the BLSR;

discovering a second set of all spans in the service provider network that are capable of participating in the BLSR;

generating and displaying a network topology display that includes only network elements that are in the first set and only spans that are in the second set.

* * * * *

UNITED STATES PATENT AND TRADEMARK OFFICE
CERTIFICATE OF CORRECTION

PATENT NO. : 7,747,727 B2  Page 1 of 1
APPLICATION NO. : 12/040674
DATED : June 29, 2010
INVENTOR(S) : David A. Friedman et al.

It is certified that error appears in the above-identified patent and that said Letters Patent is hereby corrected as shown below:

On the face of the application insert Item:

-- [63] Related U.S. Application Data

Continuation of Ser. No. 10/315,554, Dec. 09, 2002, Pat. No. 7,363,362. --

Signed and Sealed this

Fourteenth Day of September, 2010

David J. Kappos
*Director of the United States Patent and Trademark Office*